(12) United States Patent
Chen

(10) Patent No.: US 12,485,537 B2
(45) Date of Patent: Dec. 2, 2025

(54) SEMICONDUCTOR PROCESSING SYSTEMS USING JIGS

(71) Applicant: ASM IP Holding, B.V., Almere (NL)

(72) Inventor: Dongyang Chen, Chandler, AZ (US)

(73) Assignee: ASM IP Holding B.V., Almere (NL)

( * ) Notice: Subject to any disclaimer, the term of this patent is extended or adjusted under 35 U.S.C. 154(b) by 609 days.

(21) Appl. No.: 17/934,918

(22) Filed: Sep. 23, 2022

(65) Prior Publication Data

US 2023/0105844 A1  Apr. 6, 2023

Related U.S. Application Data

(60) Provisional application No. 63/248,881, filed on Sep. 27, 2021.

(51) Int. Cl.
| | |
|---|---|
| *B25J 9/16* | (2006.01) |
| *B25J 11/00* | (2006.01) |
| *H01L 21/677* | (2006.01) |
| *H01L 21/687* | (2006.01) |

(52) U.S. Cl.
CPC ........... *B25J 9/1656* (2013.01); *B25J 9/1692* (2013.01); *B25J 11/0095* (2013.01); *H01L 21/67703* (2013.01); *H01L 21/68707* (2013.01); *G05B 2219/39001* (2013.01)

(58) Field of Classification Search
CPC .... B25J 9/1656; B25J 9/1692; B25J 11/0095; H01L 21/67703; H01L 21/68707; G05B 2219/39001
See application file for complete search history.

(56) References Cited

U.S. PATENT DOCUMENTS

| | | | |
|---|---|---|---|
| 3,934,753 A | 1/1976 | Curtiss | |
| 4,710,910 A | 12/1987 | Ejiri | |
| 5,323,382 A | 6/1994 | Takahashi | |
| 6,057,995 A | 5/2000 | Yamashita | |
| 6,613,200 B2 | 9/2003 | Li | |
| 9,478,451 B2 * | 10/2016 | Hosek | B25J 19/02 |
| 10,976,119 B2 | 4/2021 | Veto | |
| 11,353,381 B1 | 6/2022 | Holeyannavar | |
| 2005/0027300 A1 | 2/2005 | Hawkins | |
| 2010/0033706 A1 * | 2/2010 | Shindo | H01L 21/67259 355/74 |
| 2010/0222923 A1 * | 9/2010 | Matsumura | H01L 21/68707 700/245 |
| 2020/0393242 A1 * | 12/2020 | Vishwanath | H01L 21/68742 |
| 2021/0291375 A1 * | 9/2021 | Bergantz | H01L 21/67742 |

(Continued)

*Primary Examiner* — Gerald McClain
(74) *Attorney, Agent, or Firm* — Banner & Witcoff, Ltd.

(57) ABSTRACT

A jig includes a disc body, a fixation pin, and a verification pin. The disc body has a first surface, an opposite a second surface, and a thickness separating the first surface from the second surface. A fixation aperture and a verification aperture extend through the thickness of the disc body and couple the first surface to the second surface of the disc body, the fixation aperture located radially outward of the verification aperture. The fixation pin is arranged to be slidably received within the fixation aperture to fix the disc body to an end effector within the semiconductor processing system. The verification pin is arranged to be slidably received within the verification aperture and supported by the disc body to indicate misregistration between the disc body and a load lock in the semiconductor processing system.

16 Claims, 13 Drawing Sheets

(56) References Cited

U.S. PATENT DOCUMENTS

2021/0378100 A1   12/2021  Criminale
2022/0076986 A1*  3/2022  Chen ................ H01L 21/67742
2023/0100356 A1*  3/2023  Chen ................ H01L 21/67742
                                                         118/728

* cited by examiner

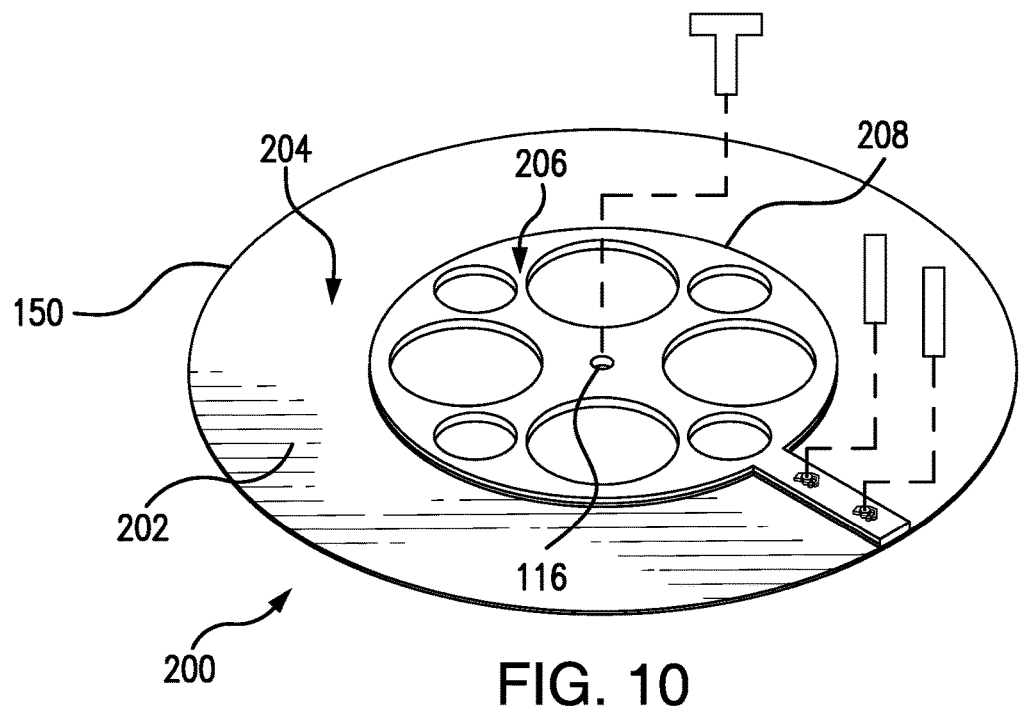
FIG. 10
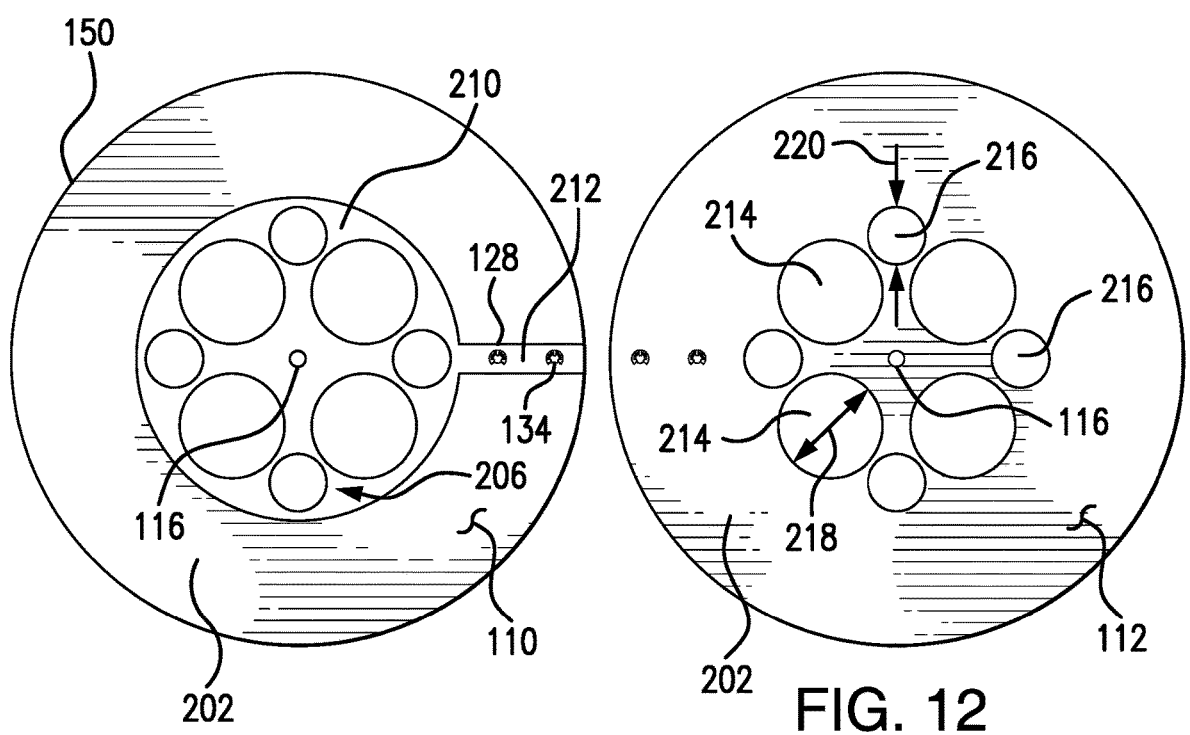
FIG. 11
FIG. 12

SEMICONDUCTOR PROCESSING SYSTEMS USING JIGS

FIELD OF INVENTION

The present disclosure generally relates to fabricating semiconductor devices, and more particularly, to substrate handling in semiconductor processing systems during the fabrication of semiconductor devices.

BACKGROUND OF THE DISCLOSURE

Semiconductor processing systems may include one or more process chambers that are adapted to carry out any number of processes, such as degassing, cleaning or pre-cleaning, deposition such as chemical vapor deposition (CVD), physical vapor deposition (PVD), or atomic layer deposition (ALD), coating, oxidation, nitration, etching (e.g., plasma etch), or the like. One or more load lock chambers may be provided to enable entry and exit of substrates from a factory interface. Each of these process chambers and load lock chambers may be included in a cluster tool, where a plurality of process chambers may be distributed about a transfer chamber, for example. A front-end transfer robot may be housed within the factory interface to transport a substrate (e.g., a silicon wafer, glass plate, or the like) between the factory interface and the load lock, and a back-end transfer robot may be housed within the transfer chamber to transport the substrate between the load lock and one or more of the process chambers. Transport of the substrates may be accomplished by one or more end effectors (e.g., clamps or blades) carried by the front-end transfer robot and the back-end transfer robot, and position of the substrates within the process chamber may be according to a substrate centering sensor within the transfer chamber.

During processing, the front-end transfer robot retrieves substrates from a pod delivered to the semiconductor processing system and places the substrates into the load lock. The back-end transfer robot in turn transports the substrates from the load lock and positions the substrates into the process chamber, which process the substrates. Once processed, the back-end transfer robot retrieves the processed substrates from the process chamber and returns the substrates to the load lock. The front-end transfer robot thereafter transports the processed substrates from the load lock to the pod, and the pod is in turn removed from the semiconductor processing system and the substrates sent on for further processing.

Transport of substrates to and from the load locks by the front-end transfer robot and the back-end transfer robot, as well as transport between the load locks and the process modules by the back-end transport robot, may be according to predetermined positions taught to the front-end transfer robot and the back-end robot. Typically, the front-end transfer robot transports substrates to and from the load lock according to a positioning taught using a camera wafer, the back-end transfer robot transports substrates to and from the load lock according a position established by user observing matchup of a substrate to scribing, and the back-end transfer robot loads substrates into the process chamber according to positioning established by cycling silicon substrates through a centering sensor. While generally acceptable for its intended purpose, camera wafers are expensive and require periodic calibration, positioning taught using substrate-to-scribe matchup may be inaccurate due to the experience level of individual observing the matchup, and slippage of silicon substates during transfer tends to limit the accuracy of centering positions established by cycling silicon substrates through the field of view of centering sensors.

Such methods and systems have generally been considered suitable for their intended purpose. However, there remains a need in the art for improved jigs, semiconductor processing systems, and methods of teaching substrate handling in semiconductor processing systems. The present disclosure provides a solution to one or more of these needs.

SUMMARY OF THE DISCLOSURE

A jig for teaching substrate handling in a semiconductor processing system includes a disc body, a fixation pin, and a verification pin. The disc body has a first surface, an opposite a second surface, and a thickness separating the first surface from the second surface. A fixation aperture and a verification aperture extend through the thickness of the disc body and couple the first surface of the disc body to the second surface of the disc body, the fixation aperture located radially outward of the verification aperture. The fixation pin is arranged to be slidably received within the fixation aperture to fix the disc body to an end effector within the semiconductor processing system. The verification pin is arranged to be slidably received within the verification aperture and supported by the disc body to indicate misregistration between the disc body and a load lock in the semiconductor processing system.

In addition to one or more of the features described above, or as an alternative, further examples of the jig may include that the jig body is formed from a carbon fiber material.

In addition to one or more of the features described above, or as an alternative, further examples of the jig may include that the fixation aperture has fixation aperture width, that the verification aperture has a verification aperture width, and that the verification aperture width is substantially equivalent to the fixation aperture width.

In addition to one or more of the features described above, or as an alternative, further examples of the jig may include that the fixation aperture is a first fixation aperture and that the disc body has at least one second fixation aperture extending through the thickness of the disc body and coupling the first surface to the second surface of disc body. The at least one second fixation aperture may be located radially outward of the first fixation aperture.

In addition to one or more of the features described above, or as an alternative, further examples of the jig may include that the disc body defines a lightening aperture extending through the thickness of the disc body. The lightening aperture may couple the first surface to the second surface of the disc body.

In addition to one or more of the features described above, or as an alternative, further examples of the jig may include that the lightening aperture is located radially between the verification aperture and the fixation aperture of the disc body.

In addition to one or more of the features described above, or as an alternative, further examples of the jig may include that the lightening aperture is circumferentially offset from the fixation aperture about the verification aperture of the disc body.

In addition to one or more of the features described above, or as an alternative, further examples of the jig may include that the lightening aperture is a first lightening aperture and that the disc body defines one or more one second lightening aperture extending through the thickness of the disc body and coupling the first surface to the second surface of the disc body.

In addition to one or more of the features described above, or as an alternative, further examples of the jig may include that the one or more second lightening aperture is radially offset from the first lightening aperture. The one or more second lightening aperture may also be circumferentially offset from the first lightening aperture about the verification aperture.

In addition to one or more of the features described above, or as an alternative, further examples of the jig may include that the first lightening aperture has a first lightening aperture width, that the one or more second lightening aperture has a second lightening aperture width, and that the second lightening aperture width is smaller than the first lightening aperture width.

In addition to one or more of the features described above, or as an alternative, further examples of the jig may include that the disc body has a thick portion, that the disc body also has a thin portion, and that the thin portion of the disc body bounds the thick portion of the disc body.

In addition to one or more of the features described above, or as an alternative, further examples of the jig may include that the thick portion of the disc body extends radially between the verification aperture and an outer circumference of the disc body.

In addition to one or more of the features described above, or as an alternative, further examples of the jig may include that the thick portion of the disc body extends circumferentially about the verification aperture of the disc body.

In addition to one or more of the features described above, or as an alternative, further examples of the jig may include that the thin portion of the disc body extends only partially about the thick portion of the disc body, and that the thick portion of the disc body radially interrupting the thin portion of the disc body.

In addition to one or more of the features described above, or as an alternative, further examples of the jig may include that the thick portion of the disc body bounds the verification aperture, that the thick portion of the disc body also bounds the fixation aperture, and that the thick portion of the disc body further extends continuously between the verification aperture and the fixation aperture of the disc body.

In addition to one or more of the features described above, or as an alternative, further examples of the jig may include that the disc body has a center and a center of gravity, and that the center of gravity is radially offset from the center of the disc body.

A semiconductor processing system is provided. The semiconductor processing system includes a load lock with a verification pin seat, a substrate centering sensor fixed relative to the load lock and having a field of view, a front-end transfer robot supported for movement relative for movement relative the load lock and including a clamp-type end effector, a back-end transfer robot supported for movement relative to the load lock and including a blade-type end effector, and a jig as described above. The disc body (a) supports the verification pin and is clamped within the blade-type end effector, (b) supports the verification pin and is fixed on the blade-type end effector by the fixation pin, or (c) is fixed on the blade-type end effector by the fixation pin and is within the field of view of the substrate centering sensor.

A method of teaching substrate handling in a semiconductor processing system is provided. The method includes, at a jig as described above, teaching a front-end transfer robot-to-load lock transfer position to a front-end transfer robot in the semiconductor processing system, teaching a back-end transfer robot-to-load lock transfer position to a back-end transfer robot in the semiconductor processing system, and teaching a substrate centering position to a substrate centering sensor in the semiconductor processing system.

In addition to one or more of the features described above, or as an alternative, further examples of the method may include that the front-end transfer robot-to-load lock transfer position is taught by (a) clamping the disc body within a clamp-type end effector of a front-end transfer robot in the semiconductor processing system; (b) registering the disc body to a chill plate located within the semiconductor processing system using the front-end transfer robot; (c) inserting the verification pin into the disc body and advancing the verification pin to a surface of the chill plate; (d) indicating misregistration between the disc body and the chill plate using the verification pin; (e) adjusting position of the disc body using the front-end transfer robot when misregistration between the disc body and the chill plate prevents insertion of the verification pin into the chill plate; and (f) writing position of the front-end transfer robot as the front-end transfer robot-to-load lock transfer position when registration of the disc body to the chill allows the verification pin to be advanced into the chill plate.

In addition to one or more of the features described above, or as an alternative, further examples of the method may include that the back-end transfer robot-to-load lock transfer position is taught by (g) fixing the disc body on a blade-type end effector of a back-end transfer robot in the semiconductor processing system using the fixation pin; (h) registering the disc body to the chill plate using the back-end transfer robot; (i) inserting the verification pin into the disc body and advancing the verification pin to the surface of the chill plate; (j) indicating misregistration between the disc body and the chill plate using the verification pin; (k) adjusting position of the disc body using the back-end transfer robot when misregistration between the disc body and the chill plate prevents insertion of the verification pin into the chill plate; and (l) writing position of the back-end transfer robot as the back-end transfer robot-to-load lock transfer position when registration of the disc body to the chill allows the verification pin to be advanced into the chill plate.

In addition to one or more of the features described above, or as an alternative, further examples of the method may include that the substrate centering position is taught by (m) transporting the disc body between the load lock and a process module of the semiconductor processing system with the disc body is fixed on the blade-type end effector; (n) acquiring centering of disc body on the blade-type end effector using the substrate centering sensor during transport between the load lock and the process module; (o) determining a substrate centering using the centering of the disc body acquired by the substrate centering sensor; and (p) writing the substrate centering to software as the substrate centering position.

In addition to one or more of the features described above, or as an alternative, further examples of the method may include that the back-end transfer robot-to-load lock transfer position is taught after the front-end transfer robot-to-load lock transfer position is taught, and that the substrate centering position is taught after the back-end transfer robot-to-load lock transfer position is taught.

In addition to one or more of the features described above, or as an alternative, further examples of the method may include removing the verification pin from the verification pin seat and the disc body prior to teaching the back-end transfer robot-to-load lock transfer position, removing the verification pin from the verification pin seat and the disc body prior to teaching the substrate centering position, that teaching the front-end transfer robot-to-load lock transfer position further comprising observing position of a seating portion of the verification pin against the chill plate through a lightening aperture extending the thickness of the disc body, and that teaching the back-end transfer robot-to-load lock transfer position further comprising observing position of the seating portion of the verification pin against the chill plate through the lightening aperture extending the thickness of the disc body.

This summary is provided to introduce a selection of concepts in a simplified form. These concepts are described in further detail in the detailed description of examples of the disclosure below. This summary is not intended to identify key features or essential features of the claimed subject matter, nor is it intended to be used to limit the scope of the claimed subject matter.

BRIEF DESCRIPTION OF THE DRAWING FIGURES

These and other features, aspects, and advantages of the invention disclosed herein are described below with reference to the drawings of certain examples of the present disclosure, which are intended to illustrate and not to limit the invention.

FIGS. 10-12 are perspective and plan views of the jig of FIG. 1 according to a second example of the jig, showing a fixation pin and a verification pin exploded away from a disc body according to the second example of the jig;

FIGS. 13-17 are plan and sectional views of the semiconductor processing system and the jig according to the second example, showing the disc body of the jig clamped within the clamp-type end effector and fixed on the blade-type end effector during teaching of transfer positions and a centering position in the semiconductor processing system; and FIGS. 18-21 are a block diagram of an example of a method of teaching substrate handling in a semiconductor processing system, showing operations of the method according to an illustrative and non-limiting example of the method.

It will be appreciated that elements in the figures are illustrated for simplicity and clarity and have not necessarily been drawn to scale. For example, the relative size of some of the elements in the figures may be exaggerated relative to other elements to help improve understanding of illustrated embodiments of the present disclosure.

DETAILED DESCRIPTION OF EXEMPLARY EMBODIMENTS

Figure 1:
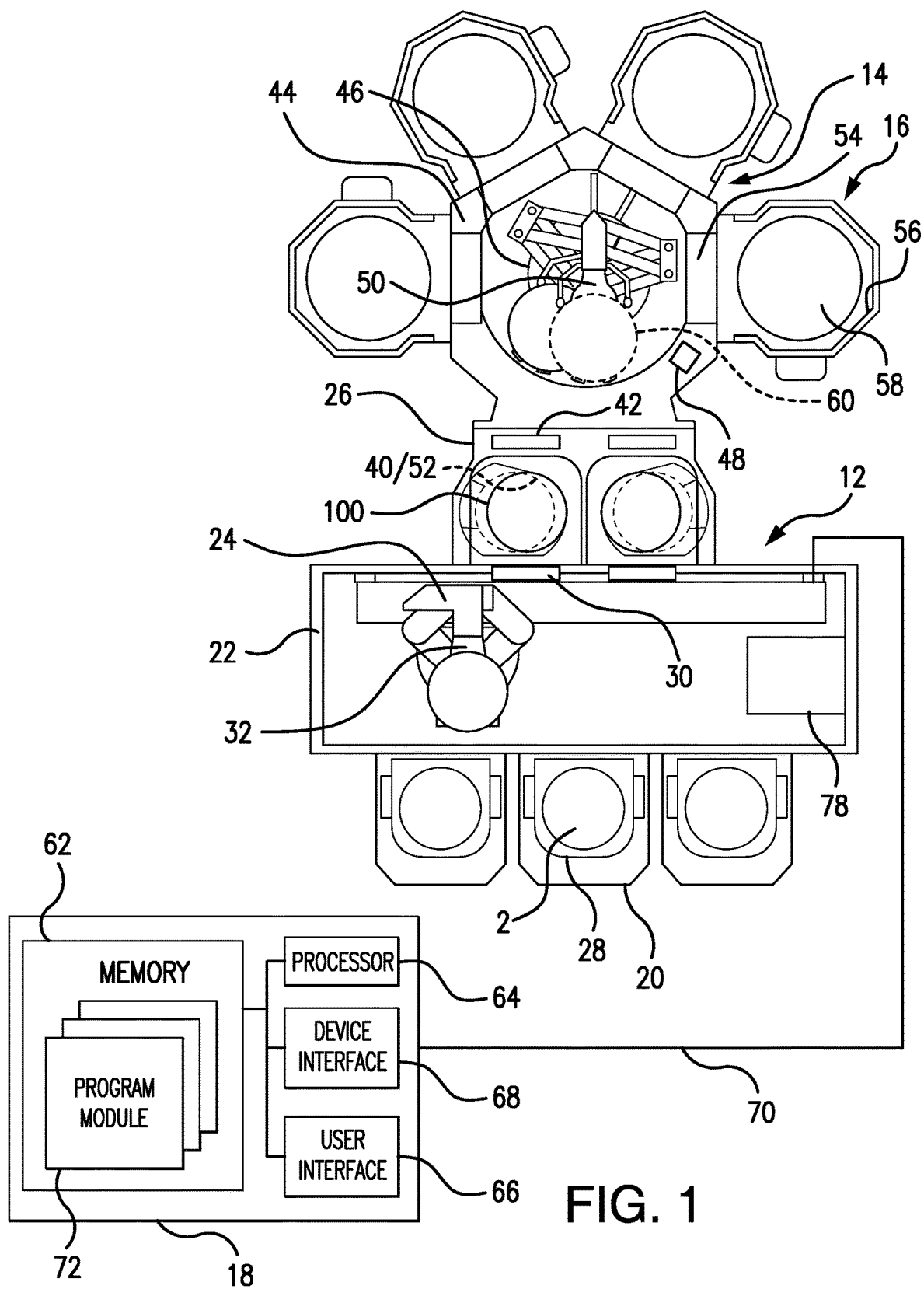
FIG. 1 is a plan view of a semiconductor processing system and a jig in accordance with the present disclosure, showing the jig in the semiconductor processing system during teach of a transfer position and/or a substrate centering position in the semiconductor processing system.

Reference will now be made to the drawings wherein like reference numerals identify similar structural features or aspects of the subject disclosure. For purposes of explanation and illustration, and not limitation, an example of a jig for teaching substrate handling in a semiconductor processing system in accordance with the present disclosure is shown in FIG. 1 and is designated generally by reference character 100. Other examples of jigs, semiconductor processing systems, and methods of teaching substrate handling in semiconductor processing systems in accordance with the present disclosure, or aspects thereof, are provided in FIGS. 2-21, as will be described. The systems and methods of the present disclosure may be used to teach one or more substrate position in semiconductor processing systems, such as semiconductor processing systems employed to deposit films onto substrates, though the present disclosure is not limited to teaching any particular substrate position or type of semiconductor processing system in general.

Referring to FIG. 1, a semiconductor processing system 10 is shown. The semiconductor processing system 10 includes a front-end module 12, back-end module 14, a process module 16, and a controller 18. The front-end module 12 is connected to the back-end module 14. The back-end module 14 is connected to the process module 16 and couples the front-end module 12 therethrough to the process module 16. The process module 16 is configured to process substrates provided to the semiconductor processing system 10, e.g., by removing and/or depositing a film onto a substrate 2, such as using a chemical vapor deposition (CVD) technique, an epitaxial deposition technique, or an atomic layer deposition (ALD) technique. The controller 18 is operatively connected to the semiconductor processing system 10. Although shown and described herein as having as specific arrangement, e.g., a cluster-type arrangement with a single back-end module and four (4) process modules with singular process chambers, it is to be understood and appreciated that semiconductor processing systems other arrangements, such as semiconductor processing systems have fewer or additional process modules and/or process modules having more than one process chamber, e.g., dual or quad chamber process modules, may also benefit from the present disclosure.

The front-end module 12 includes a load port 20, a front-end transfer chamber 22, a front-end transfer robot 24, and a load lock 26. The load port 20 is configured to seat a pod 28, e.g., a front-opening unified pod (FOUP), containing a substrate, e.g., the substrate 2, and is connected to the front-end transfer chamber 22. As used herein, the term "substrate" refers, in addition to its ordinary meaning, to either the workpiece upon which deposition is desired, or the surface exposed to deposition gases. Examples of substrates include a single crystal silicon wafer; a semiconductor on insulator ("SOI") substrate; or an epitaxial silicon, silicon germanium or III-V material deposited upon an underlying substrate. Substrates are not limited to wafers, and also include glass, plastic, or other substrates employed in fabricating semiconductor devices.

The front-end transfer chamber 22 is connected to the load lock 26 by a front-end gate valve 30, is connected to the load port 20, and houses the front-end transfer robot 24. The front-end transfer robot 24 includes a clamp-type end effector 32 and is movably supported within the front-end transfer chamber 22 to transport substrates, e.g., the substrates 2, between the load port 20 and the load lock 26. The load lock 26 includes a chill plate 34 with a verification pin seat 36 (shown in FIG. 6) and a storage rack 38 (shown in FIG. 5). It is contemplated that the front-end transfer robot 24 be configured to transport substrates between the load port 20 and the load lock 26 according to a predetermined front-end transfer robot-to-load lock transfer position 40. It is further contemplated that the front-end transfer robot-to-load lock transfer position 40 may be taught to the front-end transfer robot 24 during a front-end transfer robot teaching event. For example, the front-end transfer robot 24 may require teaching during acceptance and qualification of the semiconductor processing system 10, subsequent to maintenance, and/or in the unlikely event that the front-end transfer robot 24 requires replacement.

The back-end module 14 includes a back-end gate valve 42, a back-end transfer chamber 44, a back-end transfer robot 46, and a substrate centering sensor 48. The back-end gate valve 42 connects the back-end transfer chamber 44 to the load lock 26 and is configured to provide selective communication the back-end transfer chamber 44 and the load lock 26 for transport of substrates, e.g., the substrate 2, therebetween. The back-end transfer chamber 44 connects the load lock 26 to the process module 16 and houses the back-end transfer robot 46. The back-end transfer robot 46 is movably supported within the transfer chamber 44 and includes a blade-type end effector 50, which is configured to transport substrates between the load lock 26 and the process module 16. It is contemplated that the back-end transfer robot 46 transport substrates between the load lock 26 and the process module 16 according to a predetermined back-end transfer robot-to-load lock transfer position 52. It is further contemplated that the back-end transfer robot-to-load lock transfer position 52 be taught to the back-end transfer robot 46 during a back-end transfer robot teaching event. For example, the back-end transfer robot 46 may require teaching during acceptance and qualification of the semiconductor processing system 10, subsequent to maintenance to of the back-end transfer robot 46, and/or in the unlikely event that the back-end transfer robot 46 requires replacement.

The process module 16 includes a process module gate valve 54, a chamber body 56, and a susceptor or heater 58. The process module gate valve 54 connects the chamber body 56 to the back-end transfer chamber 44 and is configured to provide selective communication between the back-end transfer chamber 44 and the chamber body 56. The chamber body 56 is connected to the back-end transfer chamber 44 and houses the susceptor or heater 58. The susceptor or heater 58 is configured to support substrates, e.g., the substrate 2, within the chamber body 56 during removal and/or deposition of a film onto the substrates. It is contemplated that back-end transfer robot 46 transport substrates between the back-end transfer chamber 44 and the chamber body 56 according to a predetermined substrate centering position 60. As above, it is contemplated that substrate centering sensor 48 be taught during a centering teaching event. For example, the substrate centering sensor 48 may require teaching during acceptance and qualification of the semiconductor processing system 10, subsequent to maintenance, and/or in the unlikely event that the substrate centering sensor 48 requires replacement.

The controller 18 includes a memory 62, a processor 64, a user interface 66, and a device interface 68. The device interface 68 communicatively couples the processor 64 to the semiconductor processing system 10, for example, by a wired or wireless link 70. The user interface 66 is operatively associated with the processor 64 and is configured to receive input from a user and/or provide output to the user. The memory 62 includes a non-transitory machine-readable medium having a plurality of program modules 72 recorded thereon containing instructions that, when read by the processor 64, cause the processor 64 to execute certain operations. Among the operations are one or more operations for transporting substrates within the semiconductor processing system 10 according to the front-end transfer robot-to-load lock transfer position 40, the back-end transfer robot-to-load lock transfer position 52 and/or the predetermined substrate centering position 60 recorded within one or more of the plurality of program modules 72 recorded on the memory 62.

During processing, the front-end transfer robot 24 transports substrates, e.g., the substrate 2, from the pod 28 through the front-end transfer chamber 22 to the storage rack 38 (shown in FIG. 7) located within the load lock 26. The back-end transfer robot 46 in turn transports substrates from the storage rack 38 through the back-end transfer chamber 44 to the process module 16, wherein the substrates are seated on the susceptor or heater 58 for processing. Once processing is complete, the back-end transfer robot 46 retrieves the processed substrates from the process module 16 and transports the processed substrates to the storage rack 38 located within the load lock 26. From the storage rack 38, the processed substrates are transported through the front-end transfer chamber 22 to the pod 28 by the front-end transfer robot 24. The pod 28 and processed substrates therein are thereafter removed from the semiconductor processing system 10 and processed substrates sent on for further processing, as appropriate for the intended semiconductor devices being fabricated on the substrates.

Transport of substrates within the semiconductor processing system 10, e.g., the substrate 2, is according to one or more positions taught within the semiconductor processing system 10. In this respect the front-end transfer robot 24 transports substrates to and from the storage rack 38 located within the load lock 26 according to the predetermined front-end transfer robot-to-load lock transfer position 40, the back-end transfer robot 46 transports substrates to and from the storage rack 38 located within the load lock 26 according to the predetermined back-end transfer robot-to-load lock transfer position 52, and the back-end transfer robot 46 positions and retrieves substrates from the process module 16 according to the predetermined substrate centering position 60. To teach one or more of the front-end transfer robot-to-load lock transfer position 40, the back-end transfer robot-to-load lock transfer position 52, and/or the predetermined substrate centering position 60, the jig 100 is provided.

Figure 2:
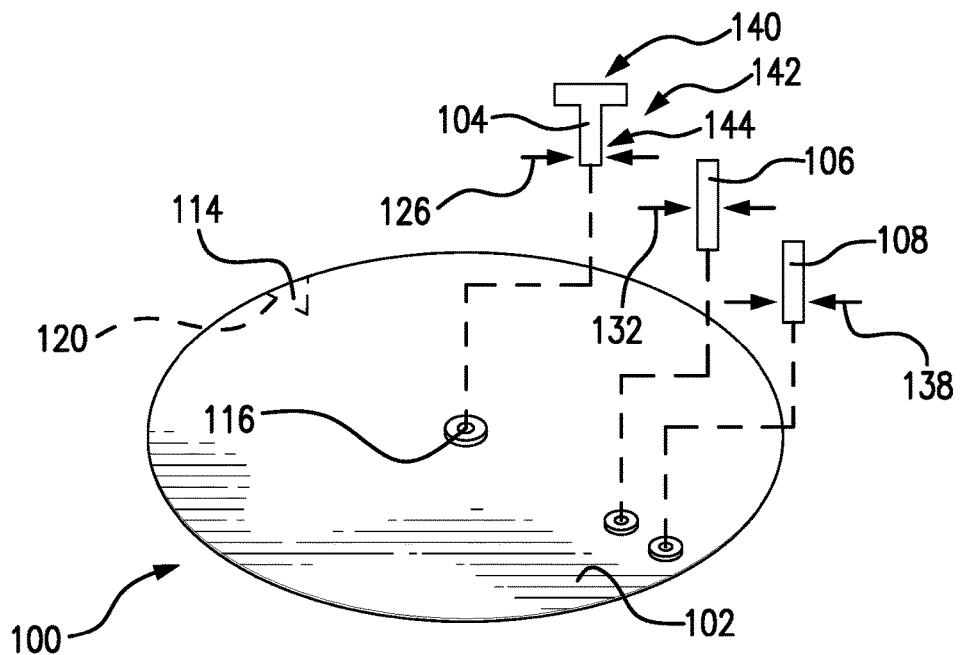
FIGS. 2-4 are perspective and plan views of the jig of FIG. 1 according to a first example of the jig, showing a fixation pin and a verification pin exploded away from a disc body according to the first example of the jig.
Figure 3:
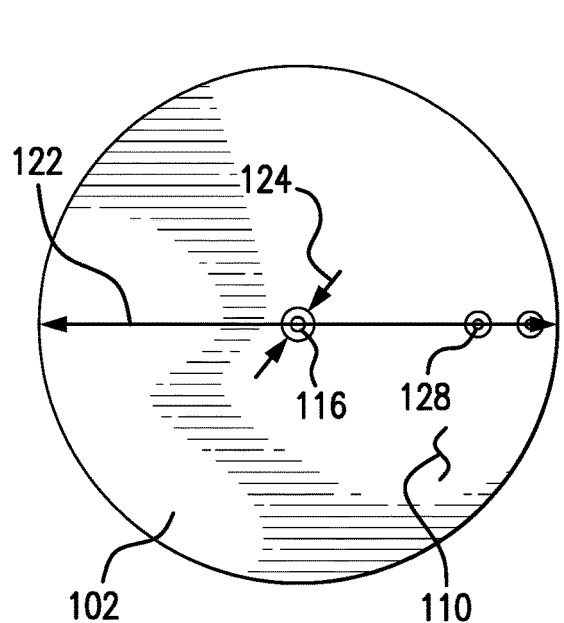
Figure 4:
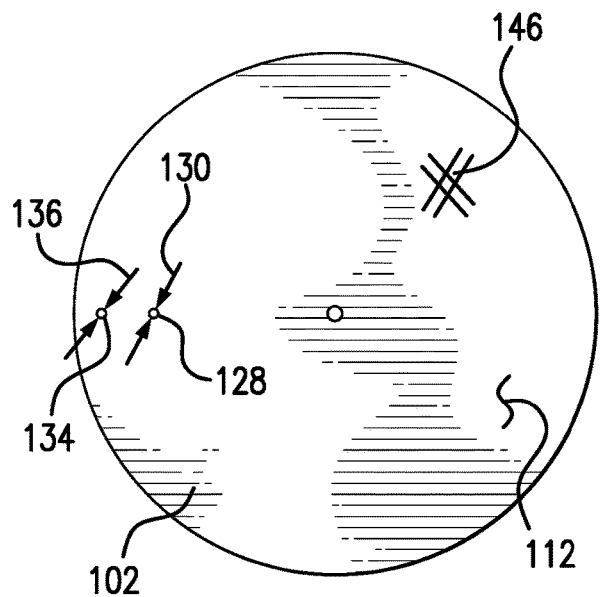

With reference to FIGS. 2-4, the jig 100 is shown according to an example of the present disclosure. As shown in FIG. 2, the jig 100 includes a disc body 102, a verification pin 104, a first fixation pin 106, and a second fixation pin 108. The disc body 102 has a first surface 110 (shown in FIG. 3), a second surface 112 (shown in FIG. 4), and an outer circumference 114. The disc body 102 also defines a centrally located verification aperture 116, a first fixation aperture 128 radially outward of the verification aperture 116, and a second fixation aperture 134 radially outward of the first fixation aperture 128. The verification pin 104 is configured to be slidably received within the verification aperture 116, the first fixation pin 106 is configured to be slidably received within the first fixation aperture 128, and that the second fixation pin 108 is configured to be slidably received within the second fixation aperture 134. Although shown and described herein as having two (2) fixation pins, it is to be understood and appreciated that other examples of the jig 100 may include a single fixation pin, or more than two fixation pins, and remain within the scope of the present disclosure.

The first surface 110 of the disc body 102 extends circumferentially about a verification aperture 116. The first surface 110 also extends radially between the verification aperture 116 and the outer circumference 114 of the disc body 102. The second surface 112 is opposite the first surface 110, is separated (i.e. spaced apart) from the first surface 110 by a thickness 118 (shown in FIG. 6) of the disc body 102 and extends circumferentially about the verification aperture 116. The second surface 112 further extends radially between the verification aperture 116 and the outer circumference 114 of the disc body 102. In certain examples, the outer circumference 114 may define a bevel. In such examples the bevel may conform in shape to bevels defined by the outer circumference substrates processed by the semiconductor processing system 10 (shown in FIG. 1). In accordance with certain examples, the outer circumference 114 may define a notch 120. In such examples, the notch 120 may confirm in shape to notches defined within the outer circumference of the substrates processed by the semiconductor processing system 10. It is also contemplated that the disc body 102 be circular in shape and define thereacross a diameter 122 (shown in FIG. 3). The diameter 122 may be substantially equivalent to diameters of substrates processed by the semiconductor processing system 10. For example, the diameter 122 may be about 200 millimeters, or about 300 millimeters, or even about 450 millimeters by way of non-limiting examples.

Referring to FIG. 3, the first surface 110 and the second surface 112 of the disc body 102 define the verification aperture 116. The verification aperture 116 in turn extends through the thickness 118 of the disc body 102 and couples the first surface 110 of the disc body 102 to the second surface 112 of the disc body 102. It is contemplated that the verification aperture 116 be configured to slidably receive therein the verification pin 104. In this respect the verification aperture 116 has a verification aperture width 124, the verification pin 104 has a verification pin width 126 (shown in FIG. 2), and the verification aperture width 124 of the verification aperture 116 is substantially equivalent to the verification pin width 126 of the verification pin 104. In certain examples, the verification aperture 116 may be defined within a verification aperture boss or doubler. In such examples the verification aperture boss or doubler may extend upwards from the first surface 110 of the disc body 102 and in a direction away from the second surface 112 of the disc body 102. As will be appreciated by those of skill in the art in view of the present disclosure, defining the verification aperture 116 within the verification aperture boss or doubler may increase stiffness of the disc body 102 around the verification aperture 116. As will also be appreciated by those of skill in the art in view of the preset disclosure, increasing stiffness of the disc body 102 limits (or eliminates) the tendency of the disc body to sag, for example, when the verification pin 104 is inserted within the verification aperture 116 and thereby improving accuracy of positions taught using the disc body 202.

The first surface 110 and the second surface 112 of the disc body 102 also define the first fixation aperture 128. More specifically, the first surface 110 and the second surface 112 define the first fixation aperture 128 at a location radially outward of the verification aperture 116. It is contemplated that the first fixation aperture 128 extend through the thickness 118 (shown in FIG. 6) of the disc body 102 and couple the first surface 110 of the disc body 102 to the second surface 112 of the disc body 102. It is also contemplated that the first fixation aperture 128 have a first fixation aperture width 130 (shown in FIG. 4), that the first fixation pin 106 have a first fixation pin width 132 (shown in FIG. 2), and that the first fixation pin 106 be substantially equivalent to the first fixation aperture width 130 of the first fixation aperture 128. In certain examples, the first fixation aperture width 130 may be substantially equivalent to the verification pin width 126. In accordance with certain examples, the first fixation aperture width 130 may be slightly smaller than the verification pin width 126. In further examples, the first fixation aperture 128 may be defined within a fixation aperture boss or doubler extending from the first surface 110 in a direction opposite the second surface 112. In such examples the fixation aperture boss or doubler may shift the center of gravity of the disc body 102 radially outward of the center of the disc body 102, simplifying insertion of the first fixation pin 106 into the first fixation aperture 128 when the disc body 102 is supported on the blade-type end effector 50 (shown in FIG. 1).

Referring to FIG. 4, the first surface 110 and the second surface 112 of the disc body 102 further define the second fixation aperture 134. The second fixation aperture 134 is similar to the first fixation aperture 128, extends through the thickness 118 (shown in FIG. 6) of the disc body 102 and couples the first surface 110 of the disc body 102 of the second surface 112 of the disc body 102, and is additionally located radially outward of the first fixation aperture 128. It is contemplated that the second fixation aperture 134 be configured to slidably receive therein the second fixation pin 08 (shown in FIG. 2). In this respect the second fixation aperture 134 has a second fixation aperture width 136, the second the second fixation pin 108 has a second fixation pin width 138 (shown in FIG. 2), and the second fixation aperture width 136 is substantially equivalent to the second fixation pin width 138 of the second fixation pin 108. In certain examples, the second fixation aperture 134, the first fixation aperture 128, and the verification aperture 116 may each arranged along a diameter of the disc body 102, e.g., along the diameter 122 (shown in FIG. 3). In accordance with certain, the second fixation aperture 134 may be circumferentially offset from the first fixation aperture 128 about the verification aperture 116.

With continuing reference to FIG. 2, the verification pin 104 has a head portion 140, a shank portion 142, and a seating portion 144. The head portion 140 is arranged such that the verification pin 104 may be suspended from the disc body 102, for example, via a button head or flange structure extending laterally outward from the shank portion 142 of the verification pin 104. The shank portion 142 defines the verification pin width 126 and connects the seating portion 144 of the verification pin 104 to the head portion 140 of the verification pin 104. The seating portion 144 is configured to be slidably received within the verification pin seat 36 defined within the chill plate 34 (shown in FIG. 1). For example, the seating portion 144 may be tapered or arcuate to provide tactile indication of the magnitude of misregistration between the disc body 102 and the chill plate 34 when inserted into (and slidably received within) the verification aperture 116 of the disc body 102. It is also contemplated that the seating portion 144 may have a blunt face to provide visual indication of direction and magnitude of misregistration between the disc body 102 and the chill plate 34 when inserted into (and slidably received within) the verification pin aperture of the disc body 102.

Referring again to FIG. 4, the disc body 102 may be formed from a composite material 146. Examples of suitable composite materials include fiberglass and carbon fiber materials. As will be appreciated by those of skill in the art in view of the present disclosure, forming the disc body 102 from a composite material can make the disc body 102 more durable that substrates processed by the semiconductor processing system 10. For example, the composite material may reduce (or eliminate) risk of damage to the disc body 102 during transport between modules within the semiconductor processing system 10. The composite material may reduce (or eliminate) risk of damage to the disc body 102 during manual manipulation and transport of the disc body 102, such as during handling by a user and/or during shipment of the disc body 102 outside of the facility housing the semiconductor processing system 10 (shown in FIG. 1). Forming the disc body 102 from the composite material also allows the for matching one or more mechanical or optical properties of the disc body 102 to those of substrates processed by the semiconductor processing system 10. For example, the composite material may be selected to match one or more of weight, stiffness, coefficient of friction, and/or reflectivity to that of substrates processed by the semiconductor processing system 10.

Figure 5:
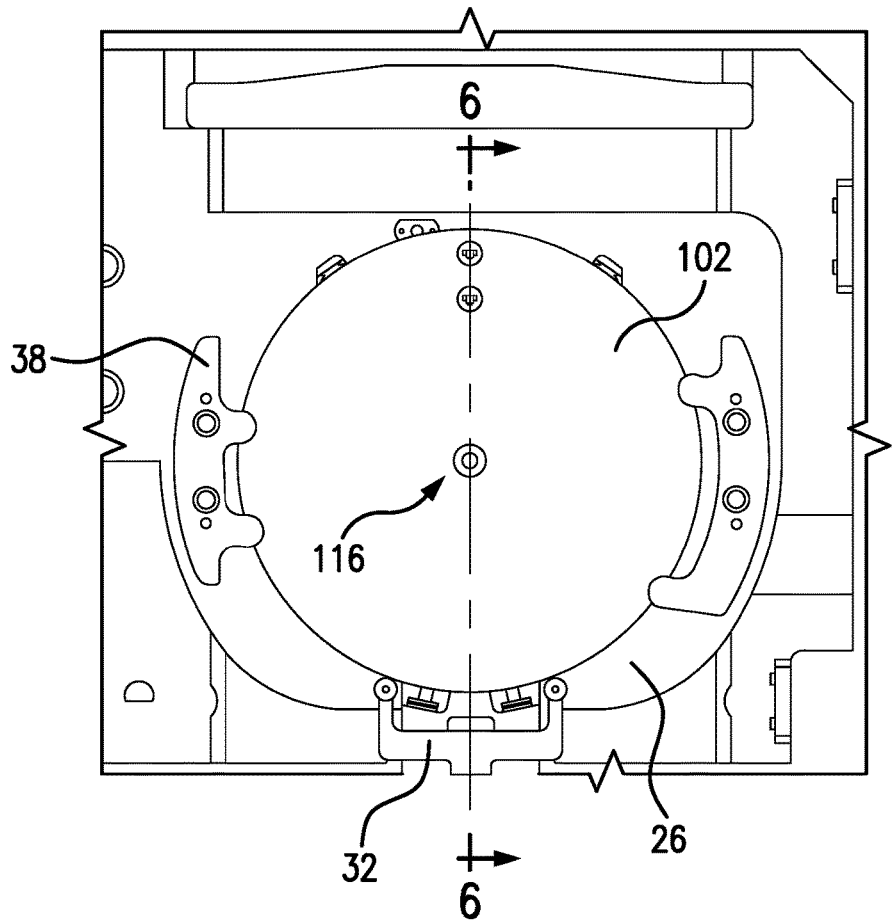
FIGS. 5-9 are plan and sectional views of the semiconductor processing system and the jig according to the first example, showing the disc body of the jig clamped within a clamp-type end effector and fixed on a blade-type end effector during teaching of transfer positions and a centering position in the semiconductor processing system.

Referring to FIGS. 5-9, the jig 100 is shown during teach of the front-end transfer robot-to-load lock transfer position 40 (shown in FIG. 1), the back-end transfer robot-to-load lock transfer position 52 (shown in FIG. 1), and the predetermined substrate centering position 60 (shown in FIG. 1) in the semiconductor processing system 10 (shown in FIG. 1). Referring to FIG. 5, teaching the front-end transfer robot-to-load lock transfer position 40 entails removing the disc body 102 from the pod 28 (shown in FIG. 1) with the front-end transfer robot 24 and transporting the disc body 102 to the load lock 26. In this respect the disc body 102 may be clamped within the clamp-type end effector 32 of the front-end transfer robot 24 (shown in FIG. 1), carried through an enclosure of the front-end transfer chamber 22 (shown in FIG. 1) by the front-end transfer robot 24, and placed in a slot of the storage rack 38 located within the load lock 26. It is contemplated that placement of the disc body 102 in the storage rack 38 be according to a default or pre-existing front-end transfer robot-to-load lock transfer position, and that misalignment between the verification aperture 116 the verification pin seat 36 defined within the chill plate 34 therefore corresponds to error in the default or pre-existing front-end transfer robot-to-load lock transfer position associated with placement of the disc body 102 within the storage rack 38.

Figure 6:
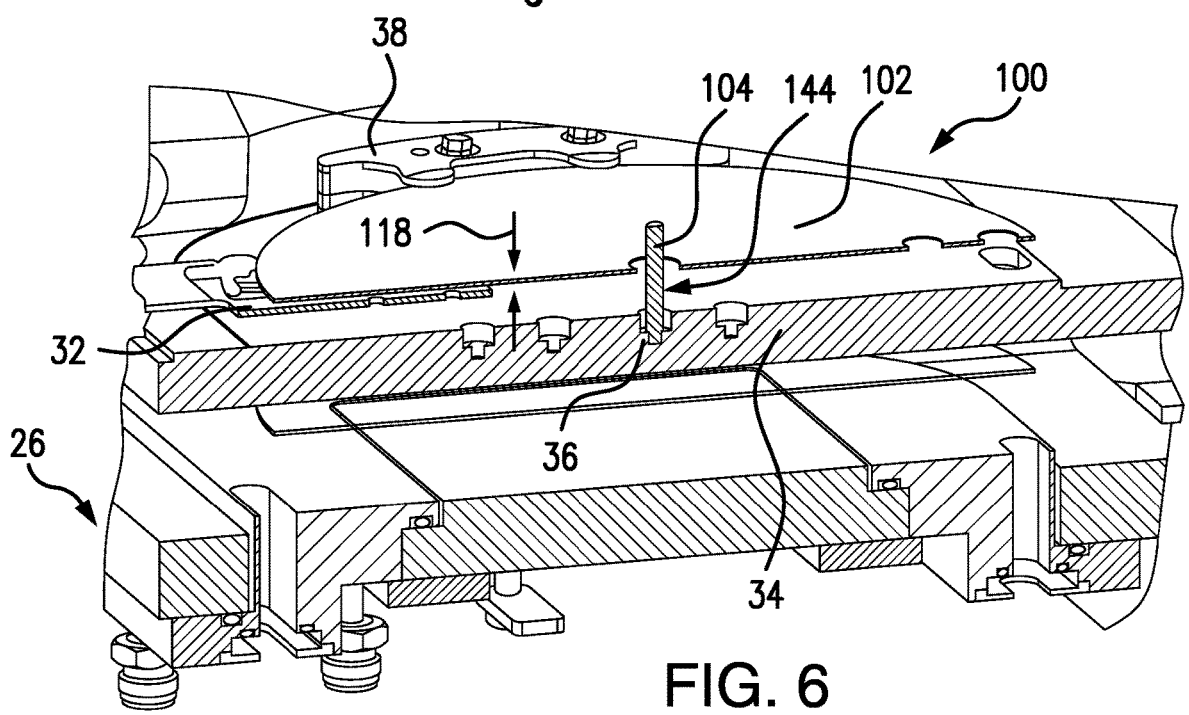

Referring to FIG. 6, the verification pin 104 is next inserted into and slidably received within the verification aperture 116 of the disc body 102. The verification pin 104 is then advanced toward a surface the chill plate 34 underlying the storage rack 38 and within the load lock 26 by the user. As the verification pin 104 is advanced toward the chill plate 34, the seating portion 144 of the verification pin 104 either contacts the surface of chill plate 34 or descends into the verification pin seat 36 defined in the chill plate 34 according to registration of the disc body 102 with the chill plate 34. When misregistration between the disc body 102 and the chill plate 34 is such that the seating portion 144 of the verification pin 104 cannot be advanced into the verification pin seat 36, misregistration is communicated by feel to user as well visually by protrusion of a portion of the verification pin 104 above the first surface 110 of the disc body 102, and the user may thereby adjust position of the clamp-type end effector 32 to reduce the misregistration. In this respect the front-end transfer robot 24 may be driven along one of more movement axis and/or rotated about one or more of the movement axis, for example, using a teaching paddle accessible to the user at the load lock 26 and operably connected to the front-end transfer robot 24, to reduce (or eliminate) misregistration between the disc body 102 and the chill plate 34 according to the feel of the fit or the visual indication provided by the height of the head portion 140 (shown in FIG. 2) of the verification pin 104 above the first surface 110 (shown in FIG. 3) of the disc body 102.

When registration between the disc body 102 and the chill plate 34 is such that the seating portion 144 of the disc body 102 can be advanced into the verification pin seat 36, and the verification pin 104 freely supported (suspended) from the disc body 102 with the seating portion 144 of the verification pin 104 slidably received within the verification pin seat 36, position of the front-end transfer robot 24 is written to software. For example, position of the front-end transfer robot 24 may be writing into one or more of the plurality of program modules 72 (shown in FIG. 1) recorded on the memory 62 (shown in FIG. 1) to update (or establish) the front-end transfer-to-load lock transfer position 40 (shown in FIG. 1). The verification pin 104 may thereafter be removed from the verification pin seat 36 of the chill plate 34 and the disc body 102 removed from the semiconductor processing system 10, or the disc body 102 transferred to the back-end transfer robot 46 for subsequent teach of the back-end transfer robot-to-load lock transfer position 52 (shown in FIG. 1), as appropriate.

Figure 7:
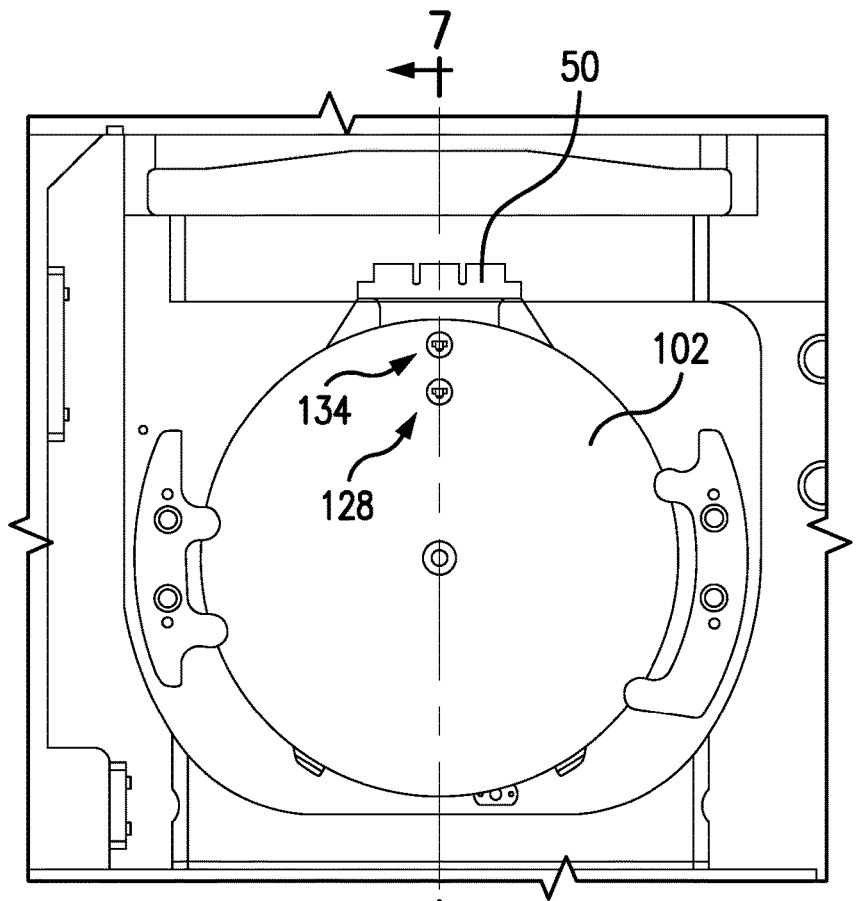

Referring to FIG. 7, teaching the back-end transfer robot-to-load lock transfer position 52 (shown in FIG. 1) entails fixing the disc body 102 on the blade-type end effector 50 of the back-end transfer robot 46 (shown in FIG. 1). In this respect fixation of the disc body 102 to the blade-type end effector 50 is accomplished by registering the fixation apertures of the disc body 102 with wrist fixation apertures, e.g., the first fixation aperture 128 registered to the first wrist fixation aperture 74 (shown in FIG. 8) and the second fixation aperture 134 registered to the second wrist fixation aperture 76 (shown in FIG. 8), extending through the blade-type end effector 50. In certain examples, registration of the first fixation aperture 128 and the second fixation aperture 134 to the first wrist fixation aperture 74 and the second wrist fixation aperture 76, respectively, may be facilitated by rotationally aligning the disc body 102 using the aligner 78 (shown in FIG. 1) during transport of the disc body 102 through the front-end transfer chamber 22 (shown in FIG. 1) of the semiconductor processing system 10 (shown in FIG. 1), for example prior to teaching either (or both) the front-end transfer robot-to-load lock transfer position 40 and the back-end transfer robot-to-load lock transfer position 52, simplifying fixation of the disc body 102 on the blade-type end effector 50.

Once registered, the first fixation pin 106 is slidably received within the first fixation aperture 128 and the first wrist fixation aperture 74, the second fixation pin 108 slidably received within the second fixation aperture 134 and the second wrist fixation aperture 76, and retainers inserted into opposite ends of the first fixation pin 106 and the second fixation pin 108. As will be appreciated by those of skill in the art in view of the present disclosure, fixation of the disc body 102 on the blade-type end effector 50 limits (or eliminates) shifting or slipping of the disc body 102 relative to the blade-type end effector 50 that could otherwise occur during transport of the disc body 102 through the back-end transfer chamber 44 (shown in FIG. 1) by the back-end transfer robot 46. Fixation of the disc body 102 on the blade-type end effector 50 also eliminates the need to assess position of the disc body 102 according to matchup between a substrate, e.g., a silicon wafer, and scribing on the blade-type end effector 50, limiting (or eliminating) inaccuracy that otherwise associated with teaching methods requiring that a user assess matchup between a substrate and a scribe line.

Figure 8:
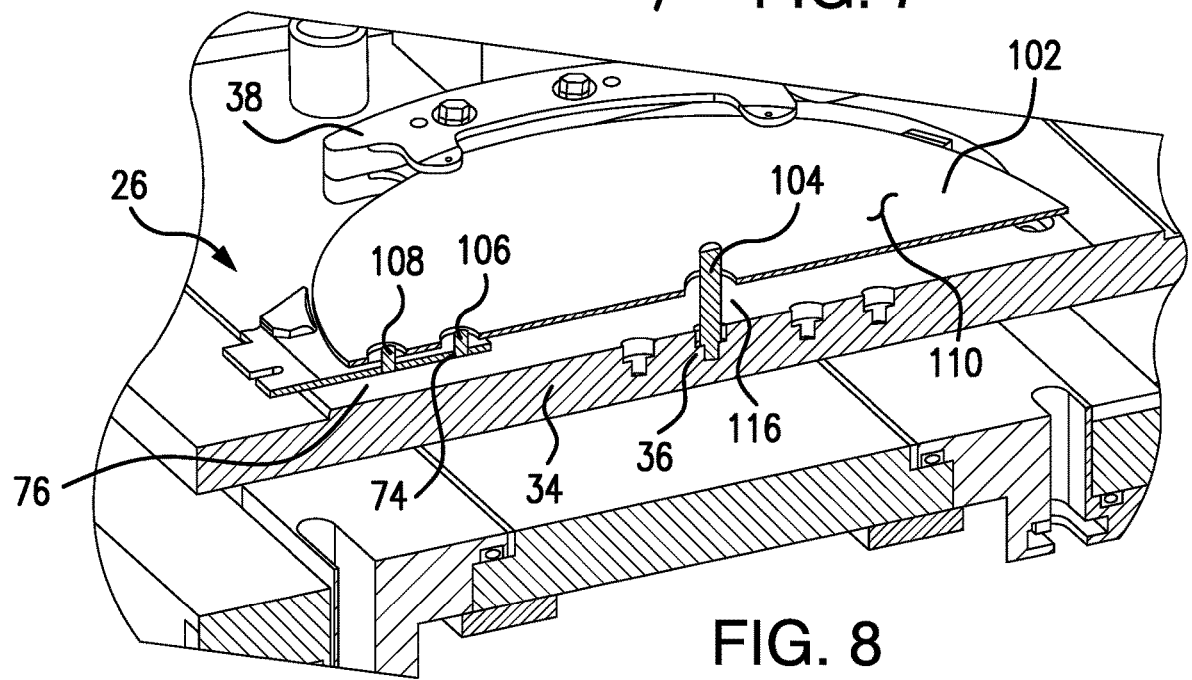

Referring to FIG. 8, the disc body 102 is next placed in a slot of the storage rack 38 by the back-end transfer robot 46 (shown in FIG. 1). As above, placement of the disc body 102 in the storage rack 38 is according to a default or pre-existing back-end transfer robot-to load lock transfer position. Misalignment between the verification aperture 116 the verification pin seat 36 defined within the chill plate 34 therefore corresponds to error in the default or pre-existing back-end transfer robot-to-load lock transfer position relative to the requirements of the semiconductor processing system 10. The verification pin 104 is thereafter inserted into and slidably received within the verification aperture 116 of the disc body 102. The verification pin 104 is then advanced toward a surface the chill plate 34 underlying the storage rack 38 and within the load lock 26 by the user.

As the verification pin 104 is advanced toward the chill plate 34, the seating portion 144 of the verification pin 104 either contacts the surface of chill plate 34 or descends into the verification pin seat 36 defined in the chill plate 34 according to registration of the disc body 102 with the chill plate 34. When misregistration between the disc body 102 and the chill plate 34 is such that the seating portion 144 of the verification pin 104 cannot be advanced into the verification pin seat 36, misregistration may be communicated tactilely (i.e., by feel) through the verification pin 104. Misregistration may also be communicated visually, for example by the longitudinal length of the verification pin 104 protruding above the first surface 110 of the disc body 102. The user may thereafter adjust position of the clamp-type end effector 32 to reduce the misregistration, for example, by driving the back-end transfer robot 24 may be driven along one of more movement axis and/or rotated about one or more of the movement axis. In certain examples, the back-end transfer robot 24 may be driven using a teaching paddle accessible to the user at the load lock 26 and operably connected to the back-end transfer robot 46.

When registration between the disc body 102 and the chill plate 34 is such that the seating portion 144 of the disc body 102 fully advances into the verification pin seat 36, and the verification pin 104 thereby freely supported (suspended) from the first surface 110 of the disc body 102 with the seating portion 144 of the verification pin 104 slidably received within the verification pin seat 36, position of the back-end transfer robot 46 is written to software. As above, position of the back-end transfer robot 46 may be written into one or more of the plurality of program modules 72 (shown in FIG. 1) recorded on the memory 62 (shown in FIG. 1) to establish (or update) the back-end transfer-to-load lock transfer position 52 (shown in FIG. 1). The verification pin 104 may thereafter be removed from the verification pin seat 36 of the chill plate 34; the first fixation pin 106 and the second fixation pin 108 removed from the blade-type end effector 50 and the disc body 102, and the disc body 102 removed from the semiconductor processing system 10; or the first fixation pin 106 and the second fixation pin 108 left in place such that the predetermined substrate centering position 60 may thereafter be taught with the disc body 102 fixed on the blade-type end effector 50, as appropriate.

Figure 9:
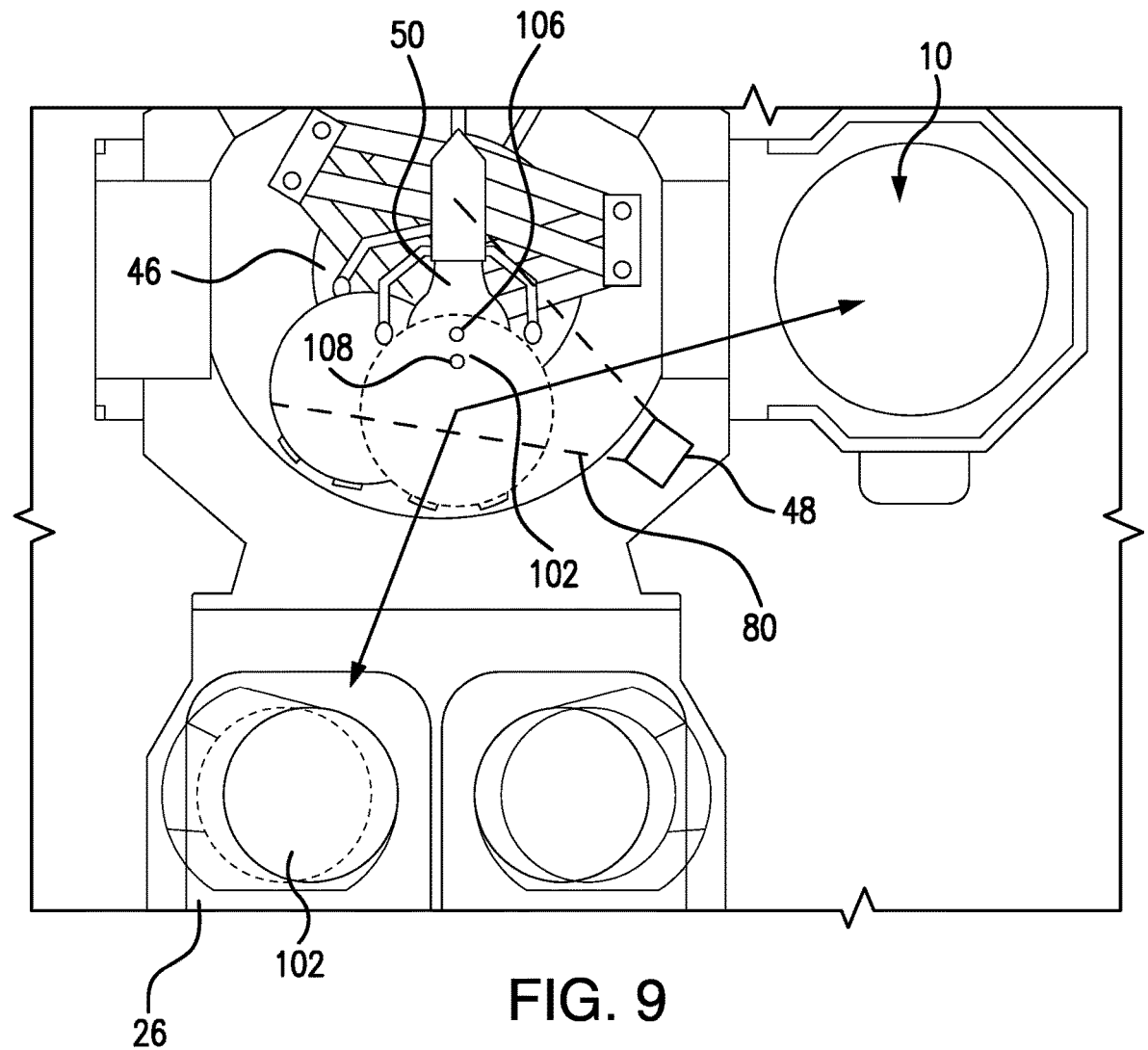

Referring to FIG. 9, the predetermined substrate centering position 60 (shown in FIG. 1) is taught by transporting the disc body 102 between the load lock 26 and the process module 16 using the back-end transfer robot 46. More specifically, the disc body 102 is transported between the load lock 26 and the process module 16 by the back-end transfer robot 46 while fixed on the blade-type end effector 50 by the first fixation pin 106 and the second fixation pin 108. It is contemplated that, as the disc body 102 is transported between the load lock 26 and the process module 16, the disc body 102 move through a field of view 80 of the substrate centering sensor 48. It is further contemplated that the substrate centering sensor 48 acquire a centering position of the disc body 102 on the blade-type end effector 50 as the disc body 102 passes through the field of view 80 of the substrate centering sensor 48, that a substrate centering position be determined using the acquired centering position of the disc body 102 on the blade-type end effector 50, and that the determined substrate centering position written to software as the predetermined substrate centering position 60. As above, the determined substrate centering position may be written into one or more of the plurality of program modules 72 (shown in FIG. 1) recorded on the memory 62 (shown in FIG. 1) to establish or update the predetermined substrate centering position 60.

As above, fixation of the disc body 102 on the blade-type end effector 50 limits (or eliminates) or slippage or shifting of the disc body 102 relative to the blade-type end effector 50 during transport of the disc body 102 between the load lock 26 and the process module 16, improving accuracy of the predetermined substrate centering position 60. In certain examples, the disc body 102 may be cycled between the load lock 26 and the process module 16, a plurality of centering positions acquired during multiple transits of the field of view 80 by the disc body 102, and a substrate centering position determined using the plurality of centering positions acquired during the transits of the field of view 80 of the substrate centering sensor 48. As will be appreciated by those of skill in the art, cycling the disc body 102 through the field of view 80 of the substrate centering sensor 48 while fixed on the blade-type end effector 50 can improve substrate handling within semiconductor processing system 10 because variation among the substrate centering positions is attributable to variables other than slippage or shifting on the blade-type end effector 50, allowing other sources of variation to be identified and resolved using the acquired centering positions.

With reference to FIGS. 10-12, a jig 200 is shown according to a second example. As shown in FIG. 10, the jig 200 according to the second example is similar to the jig 100 (shown in FIG. 1) according to the first example and additionally includes a disc body 202. The disc body 202 has a thin portion 204, a thick portion 206, and a rim 208. The disc body 202 also defines therethrough a first plurality of lightening apertures 214 and a second plurality of lightening apertures 216 extending through the disc body 202 and coupling the first surface 110 with the second surface 112 through a thickness of the disc body 202.

Referring to FIG. 11, the thick portion 206 of the disc body 202 has a thickness that is greater than a thickness of the thin portion of the disc body 202, includes an annular segment 210 and a radial segment 212, and is bounded by the rim 208. The thick portion 206 also defines the verification aperture 116, the first fixation aperture 128, and the second fixation aperture 134. In this respect verification aperture 116 extends through the annular segment 210 of the thick portion 206 and the annular segment 210 extends circumferentially about the verification aperture 116. In further respect, the radial segment 212 extends radially from the annular segment 210 to an outer circumference 150 of the disc body 202 such that the thick portion 206 spans the verification aperture 116 and the outer circumference 150 of the disc body 202, and the first fixation aperture 128 and the second fixation aperture 134 extend through radial segment 212 of the thick portion 206 of the disc body 202. In certain examples, the radial segment 212 of the thick portion 206 may shift a center of gravity of the disc body 202 away from a center of the disc body 202.

Referring to FIG. 12, the first plurality of lightening apertures 214 are defined within the first surface 110 and the second surface 112 of the disc body 202. More specifically, the first plurality of lightening apertures 214 are defined by the thick portion 206 of the disc body 202, extend through a thickness of the thick portion 206 of the disc body 202. Specifically, the first plurality of lightening apertures 214 are defined by the annular segment 210 of the thick portion 206 of the disc body 202 and are circumferentially distributed about the verification aperture 116 of the disc body 202. The first plurality of lightening apertures 214 are further symmetrically distributed about the verification aperture 116 of the disc body 202. As shown and described herein the first plurality of lightening apertures 214 includes four (4) lightening apertures each having a first lightening aperture diameter 218. As will be appreciated by those of skill in the art in view of the present disclosure, the disc body 202 may define fewer or additional lightening apertures and remain within the scope of the present disclosure.

The second plurality of lightening apertures 216 are also defined within the first surface 110 and the second surface 112 of the disc body 202, also extend through the annular segment 210 of the thick portion 206 of the disc body 202, and are further circumferentially interposed between circumferentially adjacent apertures the first plurality of lightening apertures 214. The second plurality of lightening apertures 216 are each arranged radially outward of apertures of the first plurality of lightening apertures 214. Each of the second plurality of lightening apertures 216 also have a second lightening aperture diameter 220, which is smaller than the first lightening aperture diameter 218 of the first plurality of lightening apertures 214. As shown and described herein the second plurality of lightening apertures 216 includes four (4) lightening apertures. As will be appreciated by those of skill in the art in view of the present disclosure, the disc body 202 may define fewer or additional lightening apertures and remain within the scope of the present disclosure.

In certain examples, the first plurality of lightening apertures 214 and the second plurality of lightening apertures 216 may match weight of the disc body 202 to weights of substrates processed by the semiconductor processing system 10 (shown in FIG. 1). In accordance with certain examples, the rim 208 may be radially spaced between the verification aperture 116 and the outer circumference 114 of the disc body 202 such that stiffness of the disc body 202 matches stiffness of substrates processed by the semiconductor processing system 10. It is also contemplated that, in accordance with certain examples, one or more of the first plurality of lightening apertures 214 and the second plurality of lightening apertures 216 may be radially spaced from the verification aperture 116 such that a user may visually observe engagement of the seating portion 144 (shown in FIG. 2) of the verification pin 104 against the surface of the chill plate 34 (shown in FIG. 6) when the verification pin 104 is slidably received within the verification aperture 116 of the disc body 202. As will be appreciated by those of skill in the art in view of the present disclosure, matching weight, stiffness, and/or allowing the user to directly observe placement of the seating portion 144 of the verification pin can simplify and/or improve accuracy of positions taught using the disc body 202 in the semiconductor processing system 10 (shown in FIG. 1).

Figure 13:
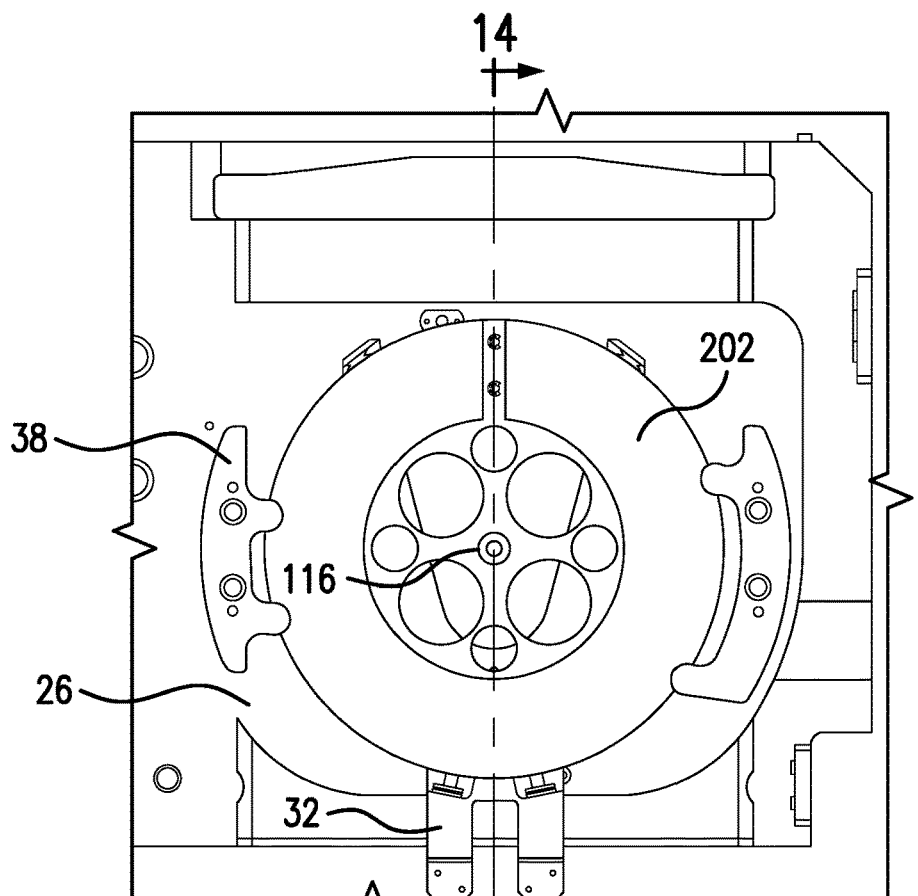

With reference to FIGS. 13-17, the jig 200 is shown during teach of the front-end transfer robot-to-load lock transfer position 40 (shown in FIG. 1), the back-end transfer robot-to-load lock transfer position 52 (shown in FIG. 1), and the predetermined substrate centering position 60 (shown in FIG. 1) in the semiconductor processing system 10 (shown in FIG. 1). Referring to FIG. 13, teaching the front-end transfer robot-to-load lock transfer position 40 similarly entails removing the disc body 202 from the pod 28 (shown in FIG. 1) with the front-end transfer robot 24 and transporting the disc body 202 to the load lock 26. In this respect the disc body 202 may be clamped within the clamp-type end effector 32 of the front-end transfer robot 24 (shown in FIG. 1), carried through the front-end transfer chamber 22 (shown in FIG. 1) by the front-end transfer robot 24, and placed in a slot of the storage rack 38 located within the load lock 26. It is contemplated that placement of the disc body 202 in the storage rack 38 be according to a default or pre-existing front-end transfer robot-to-load lock transfer position, and that misalignment between the verification aperture 116 the verification pin seat 36 defined within the chill plate 34 therefore corresponds to error in the default or pre-existing front-end transfer robot-to-load lock transfer position associated with placement of the disc body 202 within the storage rack 38.

Figure 14:
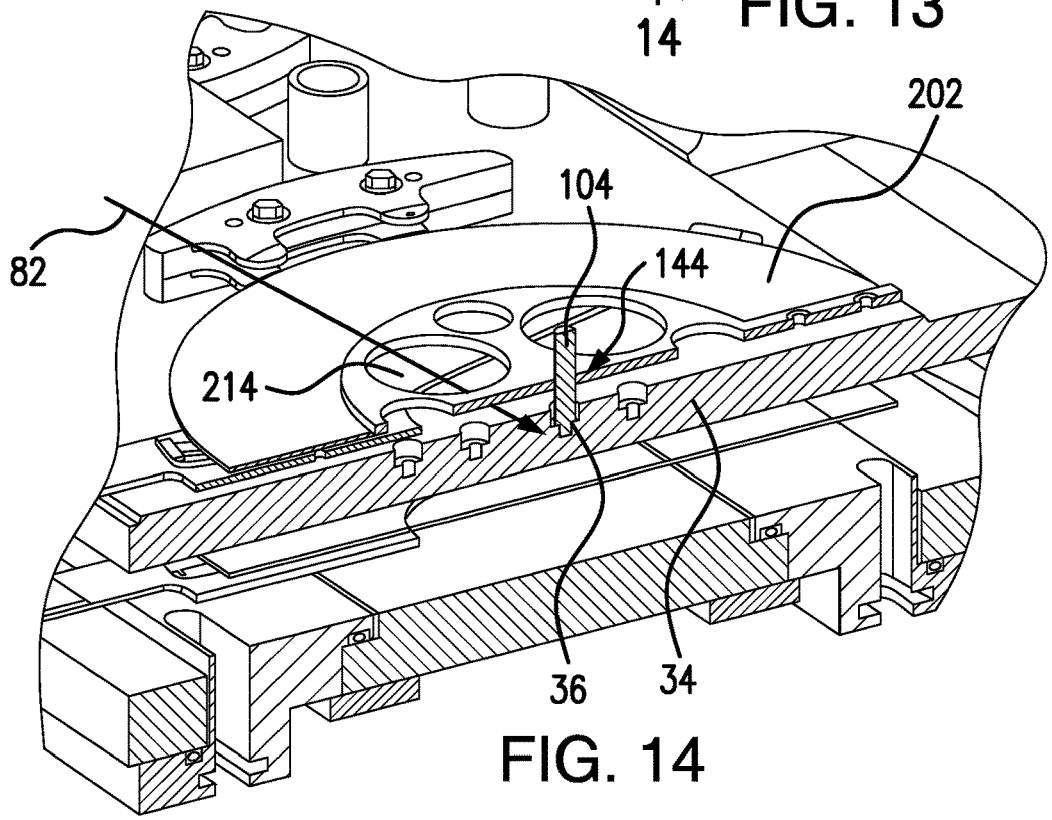

Referring to FIG. 14, the verification pin 104 is next inserted into and slidably received within the verification aperture 116 of the disc body 202. The verification pin 104 is then advanced toward a surface the chill plate 34 underlying the storage rack 38 and within the load lock 26 by the user with the user directly observing the seating portion 144 of the verification pin 104 along a sight line 82 passing through one of the first plurality of lightening apertures 214 and the second plurality of lightening apertures 216. As the verification pin 104 advances toward the chill plate 34, the seating portion 144 of the verification pin 104 either contacts the surface of chill plate 34 or descends into the verification pin seat 36 defined in the chill plate 34 according to registration of the disc body 202 with the chill plate 34. Advantageously, the user is able to directly observe both the direction and magnitude of the misregistration, simplifying assessment of misregistration between the disc body 202 and the chill plate 34.

When misregistration between the disc body 202 and the chill plate 34 is such that the seating portion 144 of the verification pin 104 cannot be advanced into the verification pin seat 36, the user may adjust position of the clamp-type end effector 32 to reduce the misregistration according to the observed engagement of the seating portion 144 of the verification pin 104. As above, front-end transfer robot 24 (shown in FIG. 1) may be driven along one of more movement axis and/or rotated about one or more of the movement axis, for example, using a teaching paddle accessible to the user at the load lock 26 and operably connected to the front-end transfer robot 24, to reduce (or eliminate) misregistration between the disc body 202 and the chill plate 34 according to the misregistration indicated by the seating portion 144 of the verification pin 104 against the surface of the chill plate 34 and observed by the user along the sight line 82. As will be appreciated by those of skill in the art in view of the present disclosure, misregistration may also be indicated by feel of the fit of verification pin 104 and/or the visual indication provided by the height of the head portion 140 (shown in FIG. 2) of the verification pin 104 above the first surface 110 (shown in FIG. 3) of the disc body 202, and remain within the scope of the present disclosure.

When registration between the disc body 202 and the chill plate 34 is such that the seating portion 144 of the disc body 202 can be advanced into the verification pin seat 36, and the verification pin 104 freely supported (suspended) from the disc body 202 with the seating portion 144 of the verification pin 104 slidably received within the verification pin seat 36, position of the front-end transfer robot 24 is written to software. As above, position of the front-end transfer robot 24 may be writing into one or more of the plurality of program modules 72 (shown in FIG. 1) recorded on the memory 62 (shown in FIG. 1) to update (or establish) the front-end transfer-to-load lock transfer position 40 (shown in FIG. 1). The verification pin 104 may thereafter be removed from the verification pin seat 36 of the chill plate 34 and the disc body 202 removed from the semiconductor processing system 10, or the disc body 202 transferred to the back-end transfer robot 46 for subsequent teach of the back-end transfer robot-to-load lock transfer position 52 (shown in FIG. 1), as appropriate.

Figure 15:
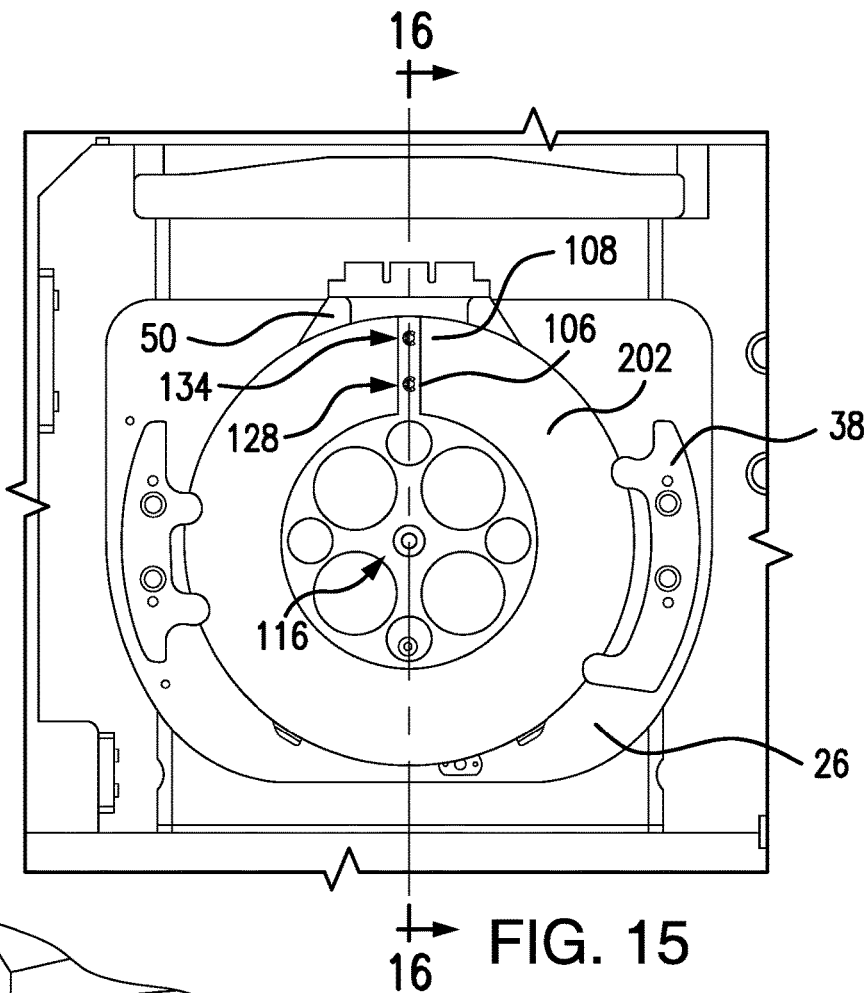

Referring to FIG. 15, teaching the back-end transfer robot-to-load lock transfer position 52 (shown in FIG. 1) entails fixing the disc body 202 on the blade-type end effector 50 of the back-end transfer robot 46 (shown in FIG. 1). In this respect fixation of the disc body 202 to the blade-type end effector 50 may also be accomplished by registering the fixation apertures of the disc body 202 with wrist fixation apertures, e.g., the first fixation aperture 128 registered to the first wrist fixation aperture 74 (shown in FIG. 8) and the second fixation aperture 134 registered to the second wrist fixation aperture 76 (shown in FIG. 8), extending through the blade-type end effector 50. In certain examples, registration of the first fixation aperture 128 and the second fixation aperture 134 to the first wrist fixation aperture 74 and the second wrist fixation aperture 76 may be facilitated by rotationally aligning the disc body 202 using the aligner 78 (shown in FIG. 1) during transport of the disc body 202 through the front-end transfer chamber 22 (shown in FIG. 1) of the semiconductor processing system 10 (shown in FIG. 1), for example prior to teaching either (or both) the front-end transfer robot-to load lock transfer position 40 and the back-end transfer robot-to load lock transfer position 52, also simplifying fixation of the disc body 202 on the blade-type end effector 50.

Once registered, the first fixation pin 106 is slidably received within the first fixation aperture 128 and the first wrist fixation aperture 74, the second fixation pin 108 slidably received within the second fixation aperture 134 and the second wrist fixation aperture 76, and retainers inserted into opposite ends of the first fixation pin 106 and the second fixation pin 108. As will be appreciated by those of skill in the art in view of the present disclosure, fixation of the disc body 202 on the blade-type end effector 50 limits (or eliminates) shifting or slipping of the disc body 202 relative to the blade-type end effector 50 that could otherwise occur during transport of the disc body 202 through the back-end transfer chamber 44 (shown in FIG. 1) by the back-end transfer robot 46. Fixation of the disc body 202 on the blade-type end effector 50 also eliminates the need to assess position of the disc body 202 according to matchup between a substrate, e.g., a silicon wafer, and scribing on the blade-type end effector 50, eliminating inaccuracy and error that can otherwise be associated by processes that require such assessments by the user.

Figure 16:
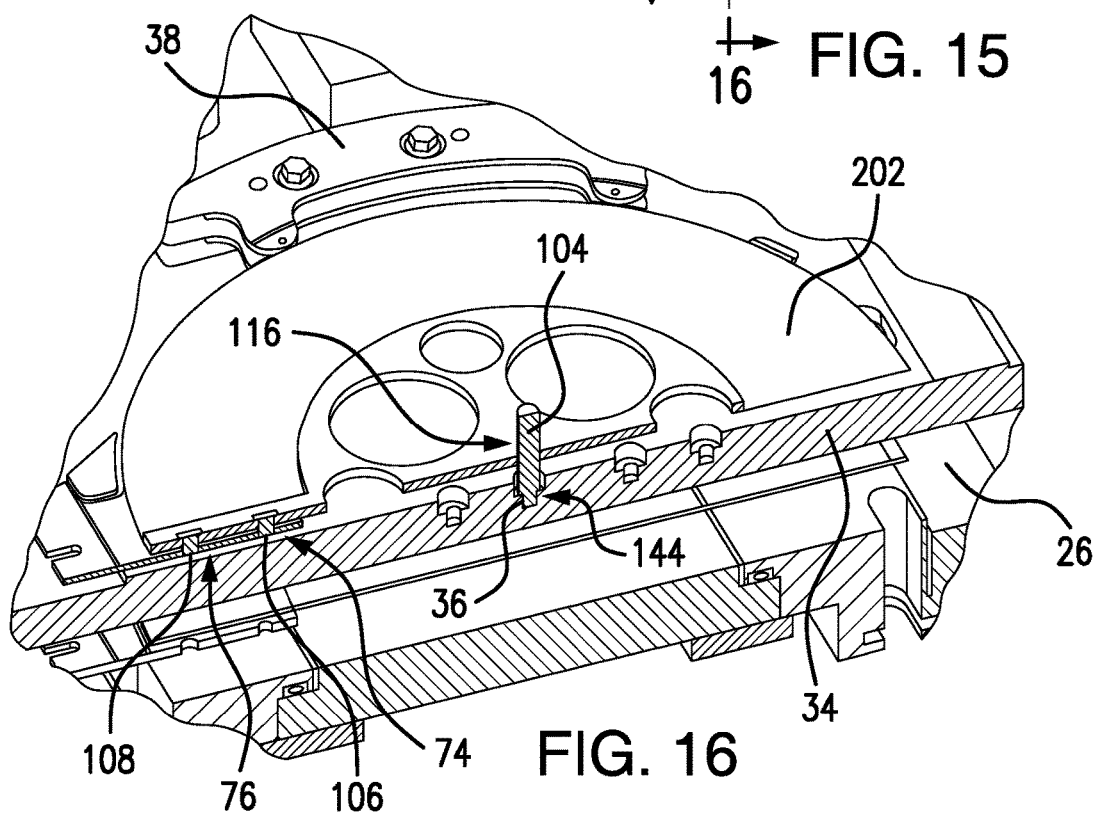

Referring to FIG. 16, the disc body 202 is next placed in a slot of the storage rack 38 located within the load lock 26 by the back-end transfer robot 46 (shown in FIG. 1). As above, placement of the disc body 202 in the storage rack 38 is according to a default or pre-existing back-end transfer robot-to-load lock transfer position. Misalignment between the verification aperture 116 the verification pin seat 36 defined within the chill plate 34 therefore correspond to error in the default or pre-existing back-end transfer robot-to-load lock transfer position relative to the requirements of the semiconductor processing system 10. The verification pin 104 is next inserted into and slidably received within the verification aperture 116 of the disc body 202. The verification pin 104 is then advanced toward a surface the chill plate 34 underlying the storage rack 38 and within the load lock 26 by the user while the user directly observes the seating portion 144 of the verification pin 104 along the sight line 82. As the verification pin 104 is advanced toward the chill plate 34, the seating portion 144 of the verification pin 104 again either contacts the surface of chill plate 34, or descends into the verification pin seat 36 defined in the chill plate 34, according to registration of the disc body 202 with the chill plate 34.

When misregistration between the disc body 202 and the chill plate 34 is such that the seating portion 144 of the verification pin 104 cannot be advanced into the verification pin seat 36, direction and magnitude of the misregistration may be directly observed by the user along the sight line 82, and the user may thereby adjust position of the clamp-type end effector 32 to reduce the misregistration. In this respect the back-end transfer robot 24 may be driven along one of more movement axis and/or rotated about one or more of the movement axis, for example, using a teaching paddle accessible to the user at the load lock 26 and operably connected to the back-end transfer robot 46, to reduce (or eliminate) misregistration between the disc body 202 and the chill plate 34 according to the observed misregistration along the sight line 82. As above, misregistration may also be again be indicated by feel of the fit or the visual indication provided by the height of the head portion 140 (shown in FIG. 2) of the verification pin 104 relative to the first surface 110 (shown in FIG. 3) of the disc body 202.

When registration between the disc body 202 and the chill plate 34 is such that the seating portion 144 of the disc body 202 can be advanced into the verification pin seat 36, and the verification pin 104 freely supported (suspended) from the disc body 202 with the seating portion 144 of the verification pin 104 slidably received within the verification pin seat 36, position of the back-end transfer robot 46 is written to software. As above, position of the back-end transfer robot 46 may be written into one or more of the plurality of program modules 72 (shown in FIG. 1) recorded on the memory 62 (shown in FIG. 1) to establish (or update) the back-end transfer-to-load lock transfer position 52 (shown in FIG. 1). The verification pin 104 may thereafter be removed from the verification pin seat 36 of the chill plate 34; the first fixation pin 106 and the second fixation pin 108 removed from the blade-type end effector 50 and the disc body 202, and the disc body 202 removed from the semiconductor processing system 10; or the first fixation pin 106 and the second fixation pin 108 left in place such that the predetermined substrate centering position 60 may thereafter be taught with the disc body 202 fixed on the blade-type end effector 50, as appropriate.

Figure 17:
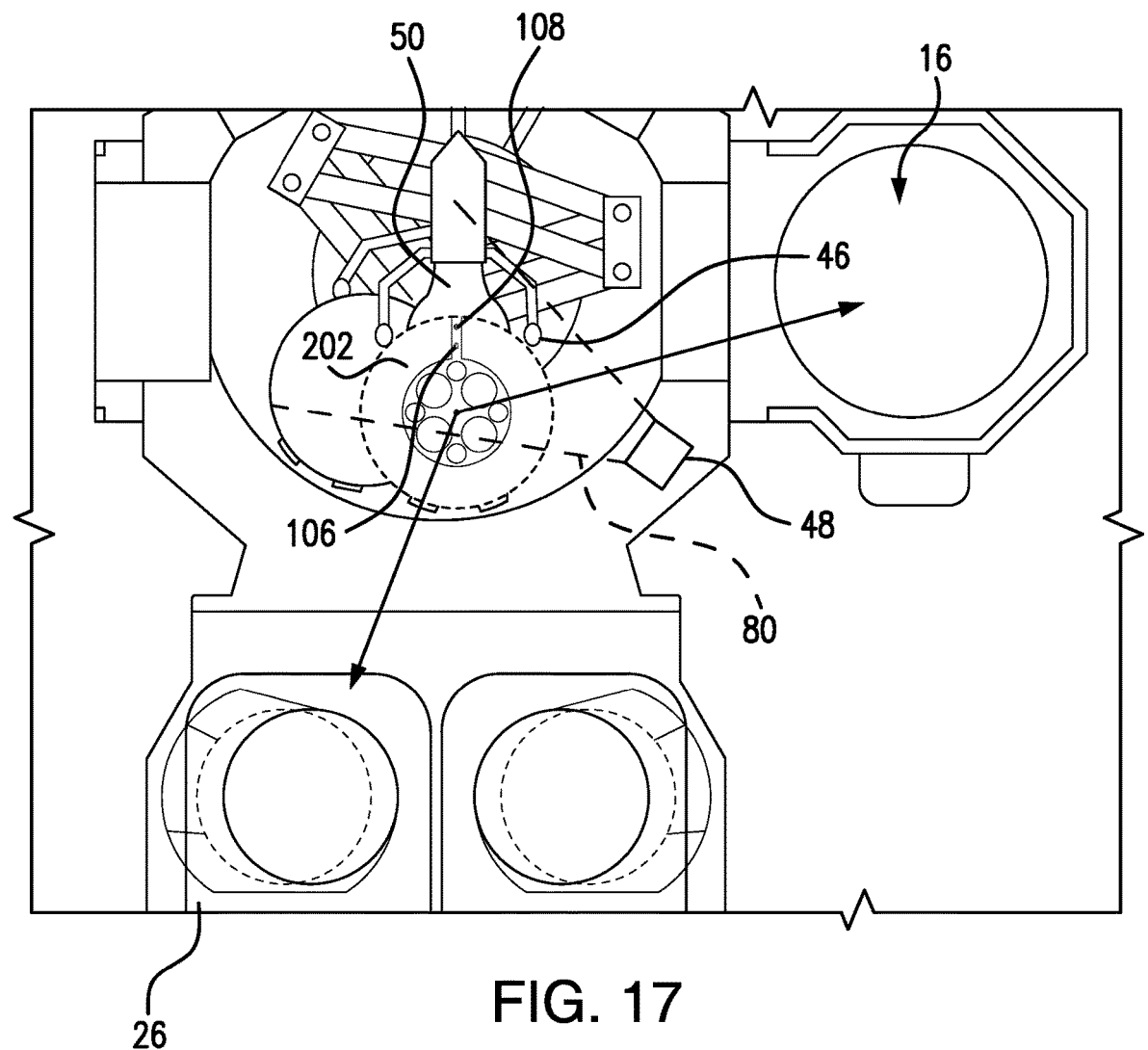

Referring to FIG. 17, the predetermined substrate centering position 60 (shown in FIG. 1) is taught by transporting the disc body 202 between the load lock 26 and the process module 16 using the back-end transfer robot 46. More specifically, the disc body 202 is transported between the load lock 26 and the process module 16 by the back-end transfer robot 46 while fixed on the blade-type end effector 50 by the first fixation pin 106 and the second fixation pin 108. It is contemplated that, as the disc body 202 is transferred between the load lock 26 and the process module 16, that the disc body 202 move through a field of view 80 of the substrate centering sensor 48. It is further contemplated that the substrate centering sensor 48 in turn acquire a centering position of the disc body 202 on the blade-type end effector 50 as the disc body 202 passes through the field of view 80, that a substrate centering position be determined using the acquired centering position of the disc body 202 on the blade-type end effector 50, and the determined substrate centering position written to software as the predetermined substrate centering position 60. As above, the determined substrate centering position may be written into one or more of the plurality of program modules 72 (shown in FIG. 1) recorded on the memory 62 (shown in FIG. 1) to establish or update the predetermined substrate centering position 60.

As above, fixation of the disc body 202 on the blade-type end effector 50 limits (or eliminates) or slippage or shifting of the disc body 202 relative to the blade-type end effector 50 during transport of the disc body 202 between the load lock 26 and the process module 16, improving accuracy of the predetermined substrate centering position 60. In certain examples, the disc body 202 may be cycled between the load lock 26 and the process module 16, a plurality of centering positions acquired during multiple transits of the field of view 80 by the disc body 202, and a substrate centering position determined using the plurality of centering positions acquired during the transits of the field of view 80 of the substrate centering sensor 48. As will be appreciated by those of skill in the art, cycling the disc body 202 through the field of view 80 of the substrate centering sensor 48 while fixed on the blade-type end effector 50 can improve substrate handling within semiconductor processing system 10 because variation among the substrate centering positions is attributable to variables other than slippage or shifting on the blade-type end effector 50, allowing other sources of variation to be identified and resolved using the acquired centering positions.

Figure 18:
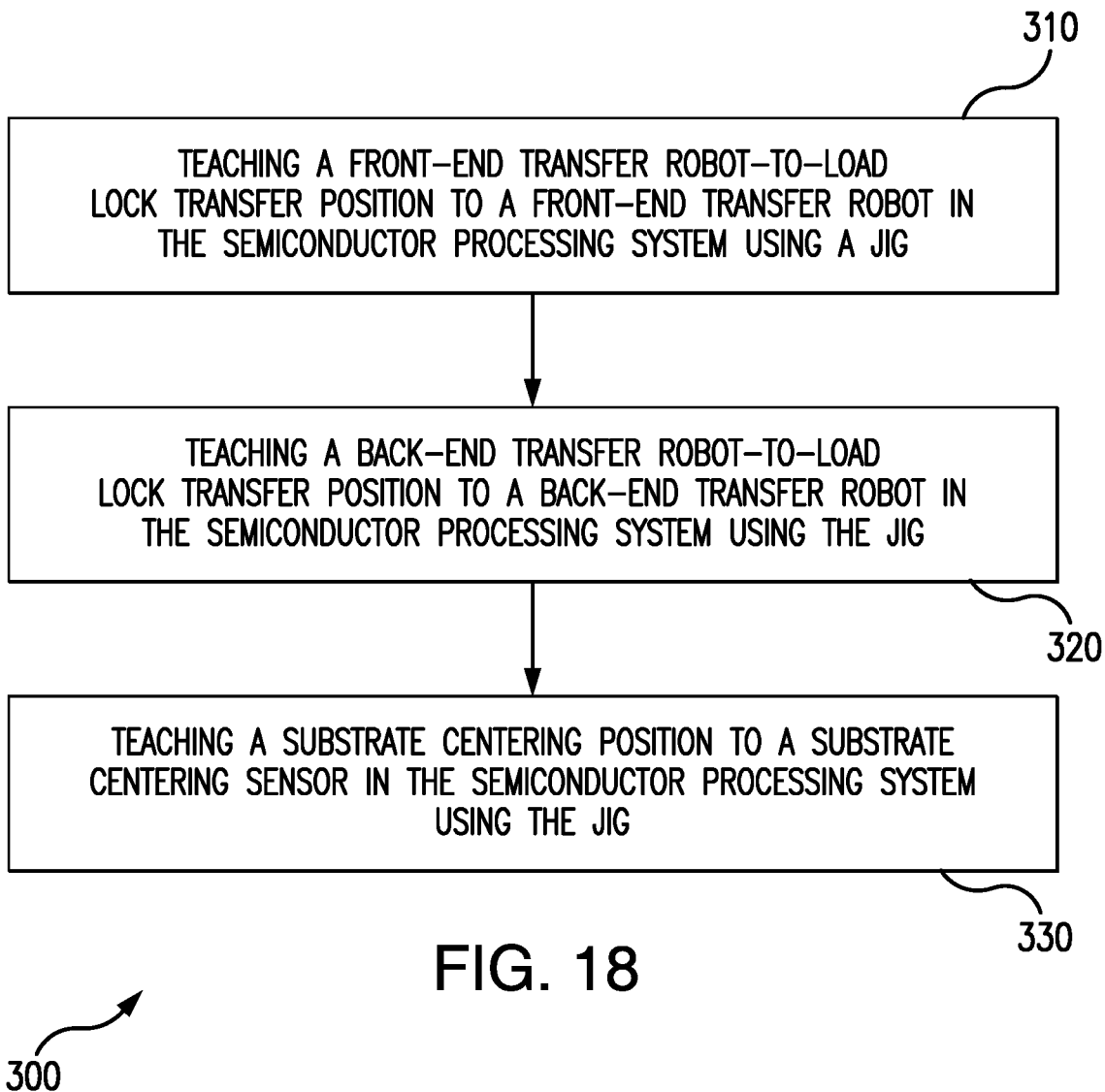

With reference to FIGS. 18-21, a method 300 of teaching substrate handling in a semiconductor processing system, e.g., the semiconductor processing system 10 (shown in FIG. 1), is shown according to an example. As shown in FIG. 18, the method 300 begins with teaching a front-end transfer robot-to-load lock transfer position in the semiconductor processing system using a jig, e.g., teaching the front-end transfer robot-to-load lock transfer position 40 (shown in FIG. 1) using the jig 100 (shown in FIG. 1), as shown with box 310. A back-end transfer robot-to-load lock transfer position is then taught in the semiconductor processing system using the jig, e.g., the back-end transfer robot-to-load lock transfer position 52 (shown in FIG. 1), as shown with box 320. A substrate centering position is thereafter taught in the semiconductor processing system using the jig, e.g. the predetermined substrate centering position 60 (shown in FIG. 1). In certain examples, each of the three (3) positions are taught sequentially in the semiconductor processing system using the jig. In accordance with certain examples, the positions may be taught in the order shown in FIG. 18, i.e., the front-end transfer robot-to-load lock transfer position, then the back-end transfer robot-to-load lock transfer position, and thereafter the substrate centering position. As will be appreciated by those of skill in the art in view of the present this disclosure, performing the illustrated operations in the order shown may reduce the time required for teaching substrate handling in the semiconductor processing system, improving the so-called 'green-to-green' time associated with the teachings. However, as will also be appreciated by those of skill in the art in view of the present disclosure, operations may be added or deleted, or the sequence of operations illustrated altered, and remain within the scope of the present disclosure.

Figure 19:
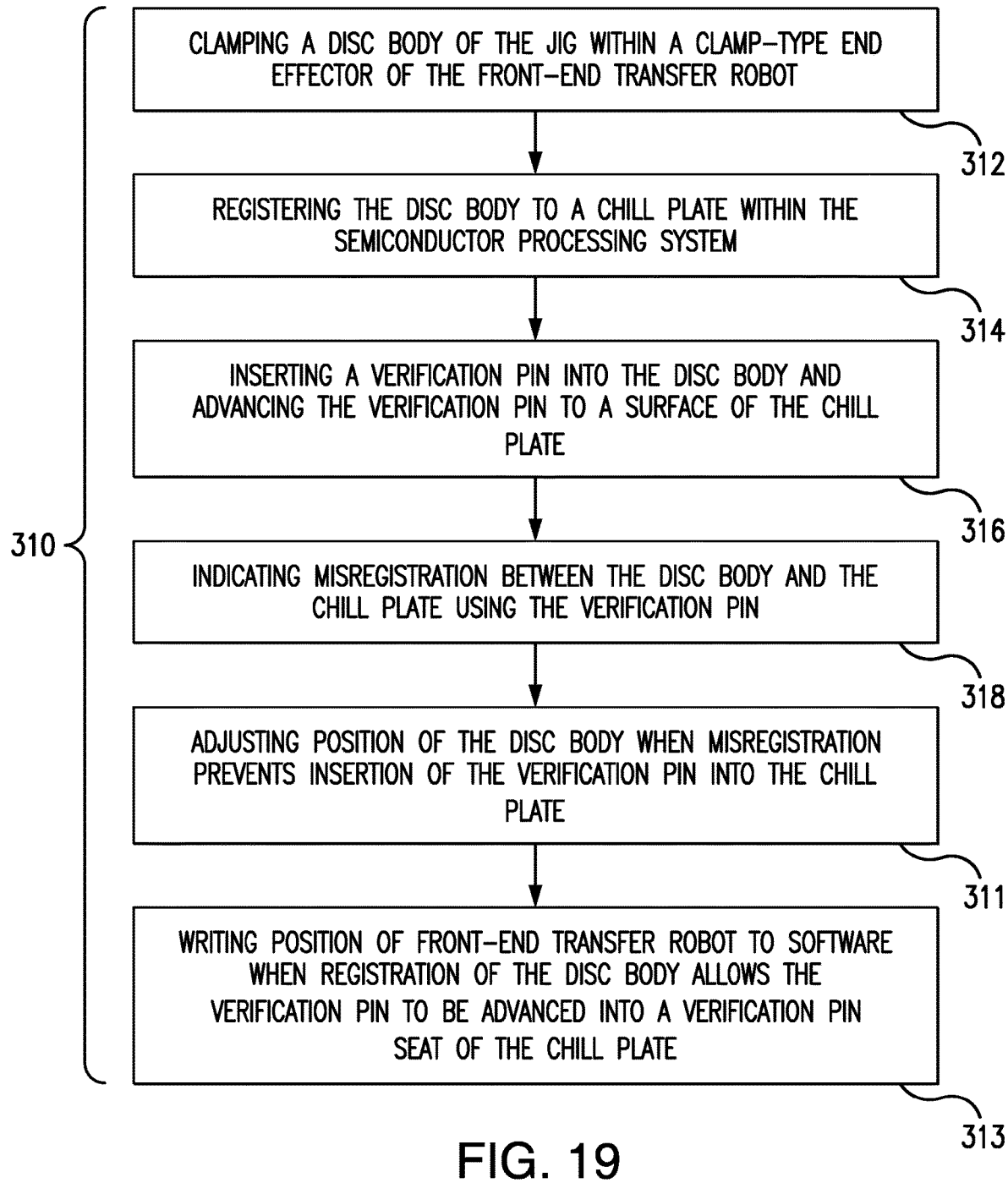

Referring to FIG. 19, operations for teaching 310 the front-end transfer robot-to-load lock transfer position using a jig, e.g., the jig 100 (shown in FIG), are shown. As shown with box 312, a disc body of the jig is first clamped within a clamp-type end effector of the semiconductor processing system, e.g., the disc body 102 (shown in FIG. 2) clamped within the clamp-type end effector 32 (shown in FIG. 1). Next, the disc body is registered to a chill plate located within a load lock of the semiconductor processing system, e.g., the chill plate 34 (shown in FIG. 1) located with the load lock 26 (shown in FIG. 1), as shown with box 314. A verification pin, e.g., the verification pin 104 (shown in FIG. 2) is thereafter inserted into the disc body and advanced toward the surface of the chill plate such that misregistration between the disc body and the chill plate is indicated with the verification pin, as shown with box 316 and box 318. Position of the disc body is adjusted using the front-end transfer robot when the misregistration between the disc body and the chill plate prevents insertion of the verification pin into a verification pin seat defined within the surface of the chill plate, e.g., the verification pin seat 36 (shown in FIG. 6), as shown with box 311. Position of the front-end transfer robot is written to software when registration of the disc body to the chill plate is such that the verification pin can be advanced into the verification pin seat defined in the chill plate, as shown with box 313.

Figure 20:
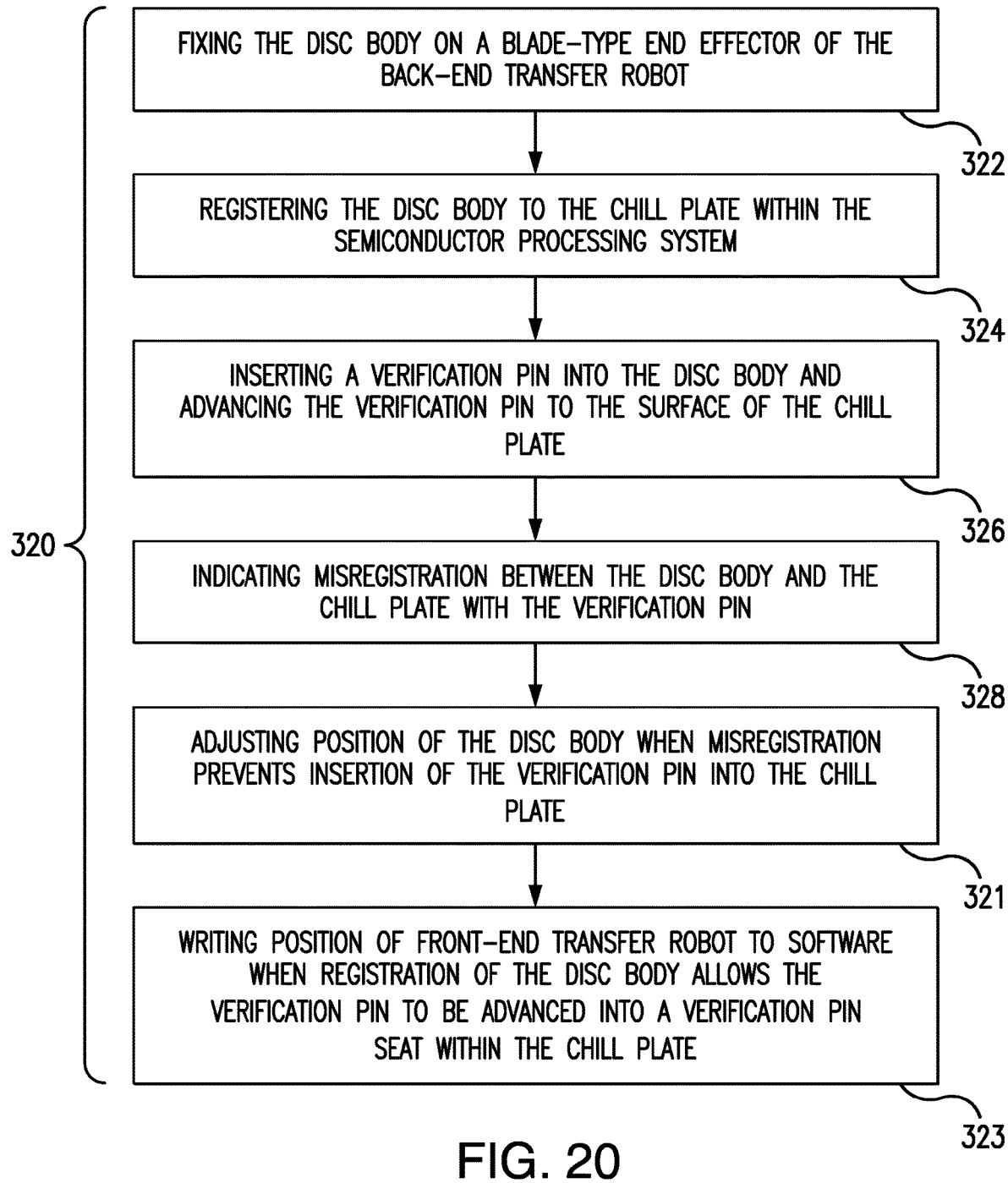

Referring to FIG. 20, operations for teaching 320 the back-end transfer robot-to-load lock transfer position using the jig are shown. As shown with box 322, the disc body of the jig is first fixed on a blade-type end effector in the semiconductor processing system, e.g., the blade-type end effector 50 (shown in FIG. 1), for example with one or more fixation pins. Next, the disc body is registered to the chill plate located within the load lock of the semiconductor processing system, as shown with box 324. The verification pin is thereafter inserted into the disc body and advanced downwards toward the surface of the chill plate such that misregistration between the disc body and the chill plate is indicated with the verification pin, as shown with box 326 and box 328. Position of the disc body is adjusted using the back-end transfer robot when the misregistration between the disc body and the chill plate prevents insertion of the verification pin into the verification pin seat defined within the surface of the chill plate, as shown with box 311. Position of the front-end transfer robot is thereafter written to software when registration of the disc body to the chill plate is such that the verification pin can be advanced into the verification pin seat defined in the chill plate, as shown with box 323.

Figure 21:
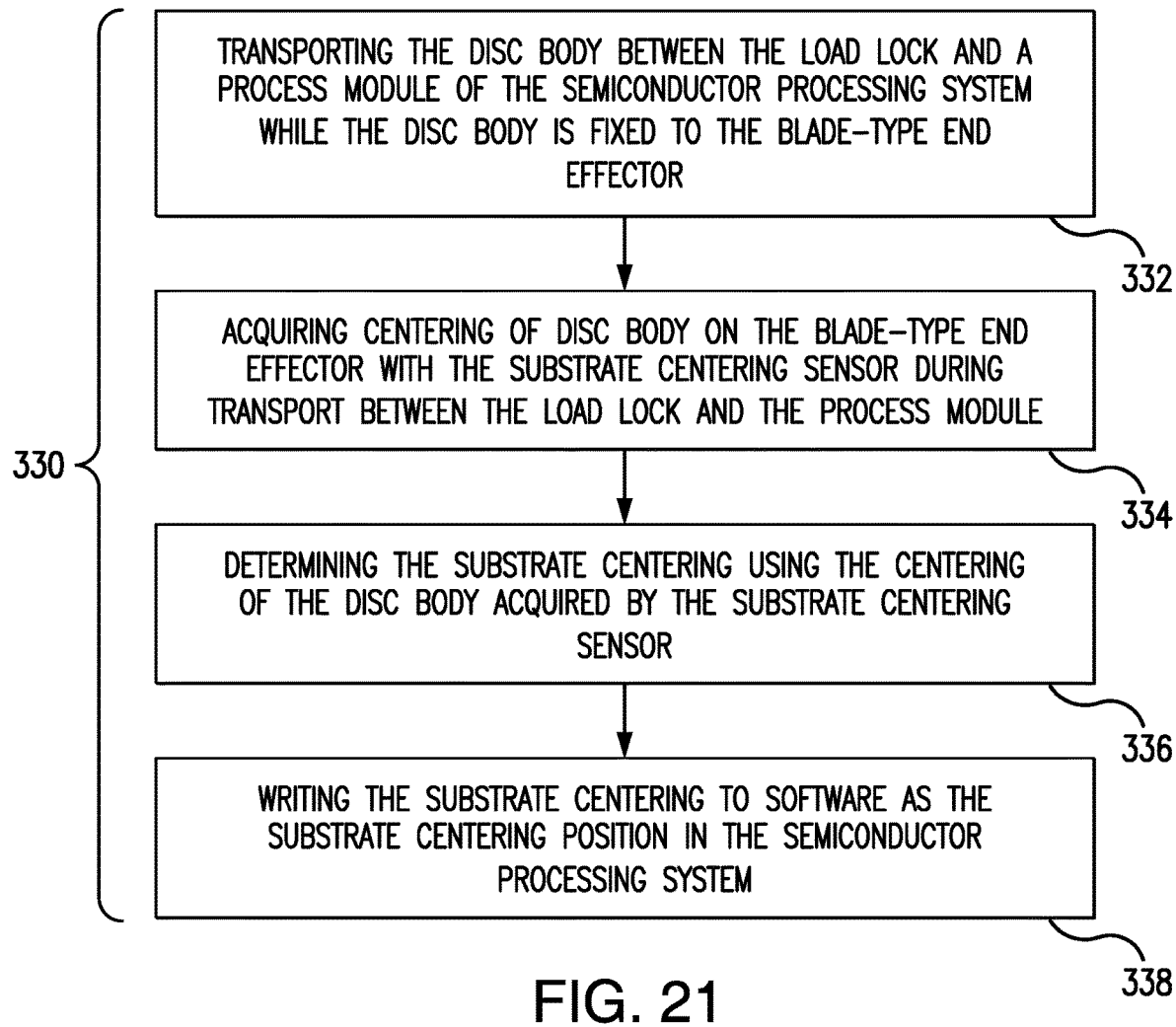

Referring to FIG. 21, operations for teaching 330 the substrate centering sensor using the jig are shown. A shown with box 332, the disc body of the jig is transported between the load lock and a process module of the semiconductor processing system while the disc body is fixed on the blade-type end effector. As shown with box 334, centering of the disc body on the blade-type end effector is acquired using the substrate centering sensor as the substrate moves through a field of view of the substrate centering sensor, e.g., the field of view 80 (shown in FIG. 9). As shown with box 336, a substrate centering position is thereafter determined using the centering of the disc body acquired by the substrate centering sensor. As shown with box 338, the determined substrate centering is thereafter written to software as the substrate centering position in the semiconductor processing system.

Transfer robots can be taught using a camera wafer or by observing matchup between a silicon wafer and scribing on the transfer robot end effector, and wafer centering sensors can be taught by cycling a silicon wafer through the field of view of the wafer centering sensor. While generally acceptable for its intended purpose, camera wafers are expensive and require periodic calibration, eyeballing silicon wafer to scribing matchup can be inconsistent and depends upon the experience of the individual observing the matchup, and wafer centering sensor calibration established by cycling silicon wafers through the field of view of the sensor may be inaccurate in the event that the wafer shifts or slides on the transfer robot end effector.

In examples described herein, a common jig is provided that can pin teach both the front-end transfer robot and the back-end transfer robot as well as teach wafer centering position to the automatic wafer centering sensor. The jig includes a disc body and pin, which eliminates the need to teach the front-end transfer robot using a camera wafer and the need to teach the back-end robot using by observing matchup between a silicon wafer and scribing on the back-end transfer robot end effector. In certain examples, the jig may further include a friction member and/or an annular rim to teach centering to a wafer centering sensor.

Although this disclosure has been provided in the context of certain embodiments and examples, it will be understood by those skilled in the art that the disclosure extends beyond the specifically described embodiments to other alternative embodiments and/or uses of the embodiments and obvious modifications and equivalents thereof. In addition, while several variations of the embodiments of the disclosure have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure should not be limited by the particular embodiments described above.

The headings provided herein, if any, are for convenience only and do not necessarily affect the scope or meaning of the devices and methods disclosed herein.

The invention claimed is:

1. A semiconductor processing system, comprising:
 a load lock with a verification pin seat;
 a substrate centering sensor fixed relative to the load lock, wherein the substrate centering sensor has a field of view;
 a front-end transfer robot supported for movement relative for movement relative to the load lock, wherein the front-end transfer robot has a clamp-type end effector;
 a back-end transfer robot supported for movement relative to the load lock, wherein the back-end transfer robot has a blade end effector; and
 a jig for teaching substrate handling, comprising:
  a disc body having a first surface, an opposite a second surface, and a thickness separating the first surface from the second surface, the disc body defining:
   a fixation aperture extending through the thickness of the disc body and coupling the first surface to the second surface of the disc body; and
   a verification aperture extending through the thickness of the disc body and coupling the first surface to the second surface of the disc body, the fixation aperture radially outward of the verification aperture;
  a fixation pin configured to be slidably received within the fixation aperture to fix the disc body to an end effector within the semiconductor processing system; and
  a verification pin configured to be slidably received within the verification aperture and supported by the disc body to indicate misregistration between the disc body and the load lock,
 wherein the disc body (a) supports the verification pin and is clamped within the blade end effector, (b) supports the verification pin and is fixed on the blade end effector by the fixation pin, or (c) is fixed on the blade end effector by the fixation pin and is within the field of view of the substrate centering sensor.

2. The semiconductor processing system of claim 1, wherein the fixation aperture has fixation aperture width, wherein the verification aperture has a verification aperture width, and wherein the verification aperture width is substantially equivalent to the fixation aperture width.

3. The semiconductor processing system of claim 1, wherein the fixation aperture is a first fixation aperture, and wherein the disc body has at least one second fixation aperture extending through the thickness of the disc body and coupling the first surface to the second surface of the disc body, the second fixation aperture located radially outward of the first fixation aperture.

4. The semiconductor processing system of claim 1, wherein the disc body defines a lightening aperture extending through the thickness of the disc body and coupling the first surface to the second surface of the disc body.

5. The semiconductor processing system of claim 4, wherein the lightening aperture is located radially between the verification aperture and the fixation aperture of the disc body.

6. The semiconductor processing system of claim 4, wherein the lightening aperture is circumferentially offset from the fixation aperture about the verification aperture of the disc body.

7. The semiconductor processing system of claim 4, wherein the lightening aperture is a first lightening aperture, wherein the disc body defines at least one second lightening aperture extending through the thickness of the disc body and coupling the first surface to the second surface of the disc body.

8. The semiconductor processing system of claim 7, wherein the at least one second lightening aperture is radially offset from the first lightening aperture, wherein the at least one second lightening aperture is circumferentially offset from the first lightening aperture about the verification aperture.

9. The semiconductor processing system of claim 7, wherein the first lightening aperture has a first lightening aperture width, wherein the at least one second lightening aperture has a second lightening aperture width, and wherein the second lightening aperture width is smaller than the first lightening aperture width.

10. The semiconductor processing system of claim 1, wherein the disc body has a thick portion and a thin portion, wherein the thin portion of the disc body bounds the thick portion of the disc body.

11. The semiconductor processing system of claim 10, wherein the thick portion of the disc body extends radially between the verification aperture and an outer circumference of the disc body.

12. The semiconductor processing system of claim 10, wherein the thick portion of the disc body extends circumferentially about the verification aperture of the disc body.

13. The semiconductor processing system of claim 10, wherein the thin portion of the disc body extends only partially about the thick portion of the disc body, the thick portion of the disc body radially interrupting the thin portion of the disc body.

14. The semiconductor processing system of claim 10, wherein the thick portion bounds the verification aperture, wherein the thick portion bounds the fixation aperture, and wherein the thick portion extends continuously between the verification aperture and the fixation aperture of the disc body.

15. The semiconductor processing system of claim 1, wherein the disc body is formed from a carbon fiber material.

16. The semiconductor processing system of claim 1, wherein the disc body has a center and a center of gravity, and wherein the center of gravity is radially offset form the center of the disc body.

* * * * *